(12) United States Patent
Bloch et al.

(10) Patent No.: US 11,186,004 B2
(45) Date of Patent: Nov. 30, 2021

(54) STABILIZING SHOE, MANUFACTURING APPARATUS, AND MANUFACTURING METHOD

(71) Applicant: The Boeing Company, Chicago, IL (US)

(72) Inventors: Daniel David Bloch, St. Peters, MO (US); Eric Moyes, Desoto, MO (US); Zachary Benjamin Renwick, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 15/797,425

(22) Filed: Oct. 30, 2017

(65) Prior Publication Data

US 2019/0126505 A1 May 2, 2019

(51) Int. Cl.
| | | |
|---|---|---|
| *B26D 7/02* | (2006.01) | |
| *B25J 15/00* | (2006.01) | |
| *B26D 7/20* | (2006.01) | |
| *B26D 7/08* | (2006.01) | |

(52) U.S. Cl.
CPC .......... *B26D 7/025* (2013.01); *B25J 15/0019* (2013.01); *B26D 7/086* (2013.01); *B26D 7/20* (2013.01)

(58) Field of Classification Search
CPC ....... B25J 15/00; B25J 15/0019; B26D 7/025; B26D 7/20; B26D 7/086
See application file for complete search history.

(56) References Cited

U.S. PATENT DOCUMENTS

| | | | | |
|---|---|---|---|---|
| 3,238,087 A | * | 3/1966 | Norwalk | B32B 27/00 428/417 |
| 3,709,643 A | * | 1/1973 | Nasica | B29C 51/167 425/510 |
| 4,545,275 A | * | 10/1985 | Pearl | B23D 27/00 30/273 |
| 4,858,289 A | * | 8/1989 | Speller, Sr. | B21J 15/10 29/34 B |
| 4,917,353 A | | 4/1990 | Riley | |
| 5,265,508 A | | 11/1993 | Bell et al. | |
| 5,308,198 A | * | 5/1994 | Pumphrey | B23Q 3/002 408/1 R |
| 5,317,943 A | * | 6/1994 | Dowdle | B23Q 11/0042 409/132 |
| 5,324,913 A | | 6/1994 | Oberg et al. | |
| 5,733,081 A | | 3/1998 | Dowdle et al. | |

(Continued)

FOREIGN PATENT DOCUMENTS

| | | |
|---|---|---|
| CN | 201817137 | 5/2011 |
| EP | 3 392 024 | 10/2018 |

(Continued)

OTHER PUBLICATIONS

European Patent Office, "Extended European Search Report," App. No. 18193041.3 (dated Mar. 20, 2019).

(Continued)

*Primary Examiner* — Ghassem Alie
*Assistant Examiner* — Fernando A Ayala
(74) *Attorney, Agent, or Firm* — Walters & Wasylyna LLC

(57) ABSTRACT

A manufacturing method includes locking a material to be cut against a cutting bed, stabilizing the material against the cutting bed, and cutting the material.

32 Claims, 22 Drawing Sheets

(56) References Cited

U.S. PATENT DOCUMENTS

| | | | |
|---|---|---|---|
| 2002/0136612 A1 | 9/2002 | Martinez et al. | |
| 2010/0075126 A1* | 3/2010 | Ford | B29C 53/582 |
| | | | 428/222 |
| 2012/0020756 A1 | 1/2012 | Zagar | |
| 2013/0059022 A1 | 3/2013 | Kanemasu et al. | |
| 2015/0321760 A1* | 11/2015 | Alford | B64D 11/00 |
| | | | 224/482 |
| 2018/0290393 A1* | 10/2018 | Bloch | B25J 15/0057 |
| 2019/0135039 A1* | 5/2019 | Filiol | B60C 9/0042 |

FOREIGN PATENT DOCUMENTS

| | | |
|---|---|---|
| GB | 2476870 | 7/2011 |
| JP | 2015 217532 | 12/2015 |
| NL | 9301691 | 4/1995 |

OTHER PUBLICATIONS

Intellectual Property Office, Combined Search and Examination Report, App. No. GB 1817449.0 (dated Mar. 27, 2019).
Intellectual Property Office, Examination Report, App. No. GB1817449.0 (dated May 22, 2020).

* cited by examiner

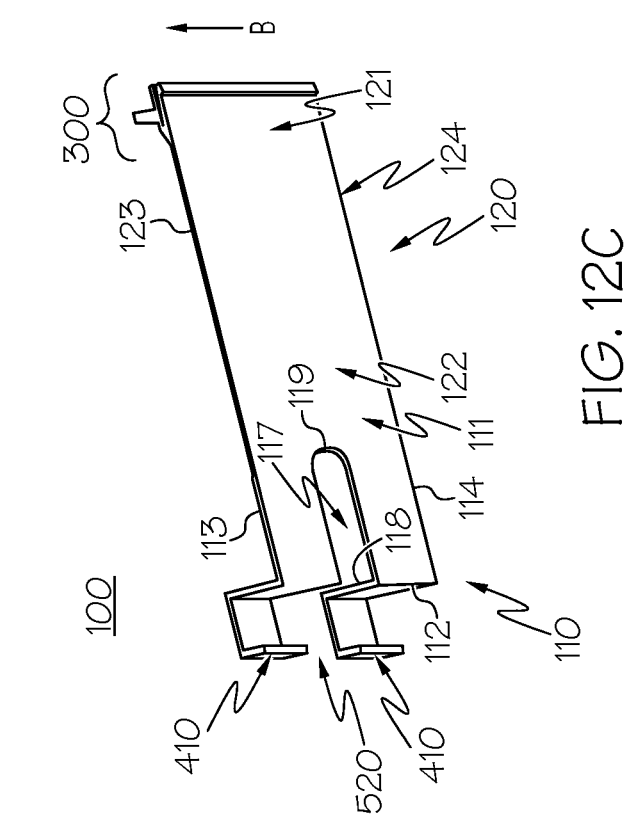
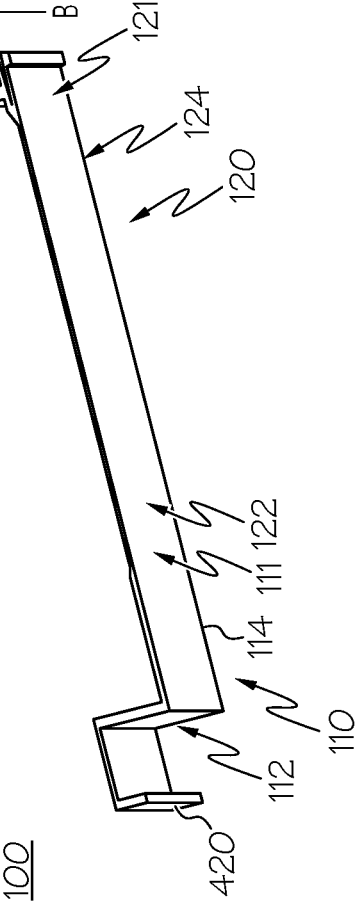
FIG. 12A
FIG. 12B
FIG. 12C

STABILIZING SHOE, MANUFACTURING APPARATUS, AND MANUFACTURING METHOD

FIELD

This application relates to a stabilizing shoe, manufacturing apparatus, and manufacturing methods.

BACKGROUND

A vacuum hold-down table may be employed to pull down a material against a processing surface while processing, such as while cutting materials with an ultrasonic knife of a robotically positioned multifunction end effector. However, some materials, e.g., porous materials, are difficult to hold with a vacuum hold-down table during processing, especially while a knife is applying lateral forces to a material to make turns as it cuts. Thus, a material being processed may slip or be torn.

An existing solution has been to cover a material to be processed with a blanket material and cut through both the blanket material and the material to be processed. This blanket material seals the vacuum leaks through the material to be processed and increases the hold down pressure applied by the vacuum hold-down table, but the force holding the material to be processed is limited. Additionally, providing a blanket material adds multiple steps to the manufacturing process and limits automation aspects.

Accordingly, those skilled in the art continue with research and development in field of manufacturing apparatus and manufacturing methods.

SUMMARY

In one embodiment, a manufacturing method includes locking a material to be cut against a cutting bed, stabilizing the material against the cutting bed, and cutting the material.

In another embodiment, a manufacturing method includes providing a thermoplastic lamina ply to a processing surface, applying a hold down loading to the thermoplastic lamina ply to stabilize the thermoplastic lamina ply by downwardly displacing an ultrasonic cutting device having a pressure foot coupled thereto that deflects upon downward displacement contact against the thermoplastic lamina, and cutting the stabilized thermoplastic lamina ply using the ultrasonic cutting device.

In yet another embodiment, a stabilizing shoe for stabilizing a material to be processed, includes a pressure foot having an engagement portion for pressing against the material to be processed, a mounting base and a biasing portion linking the pressure foot and the mounting base.

In yet another embodiment, a cutting apparatus includes a cutting device for cutting a material, a pressure foot having an engagement portion for pressing against the material to be processed; and a biasing portion linking the pressure foot and the cutting device.

Other embodiments of the disclosed stabilizing shoe, manufacturing apparatus, and manufacturing methods will become apparent from the following detailed description, the accompanying drawings and the appended claims.

BRIEF DESCRIPTION OF THE DRAWINGS

FIGS. 12A to 12C are perspective views of a pressure foot showing a build direction during a layer-by-layer additive manufacturing process.

DETAILED DESCRIPTION

Figure 1:
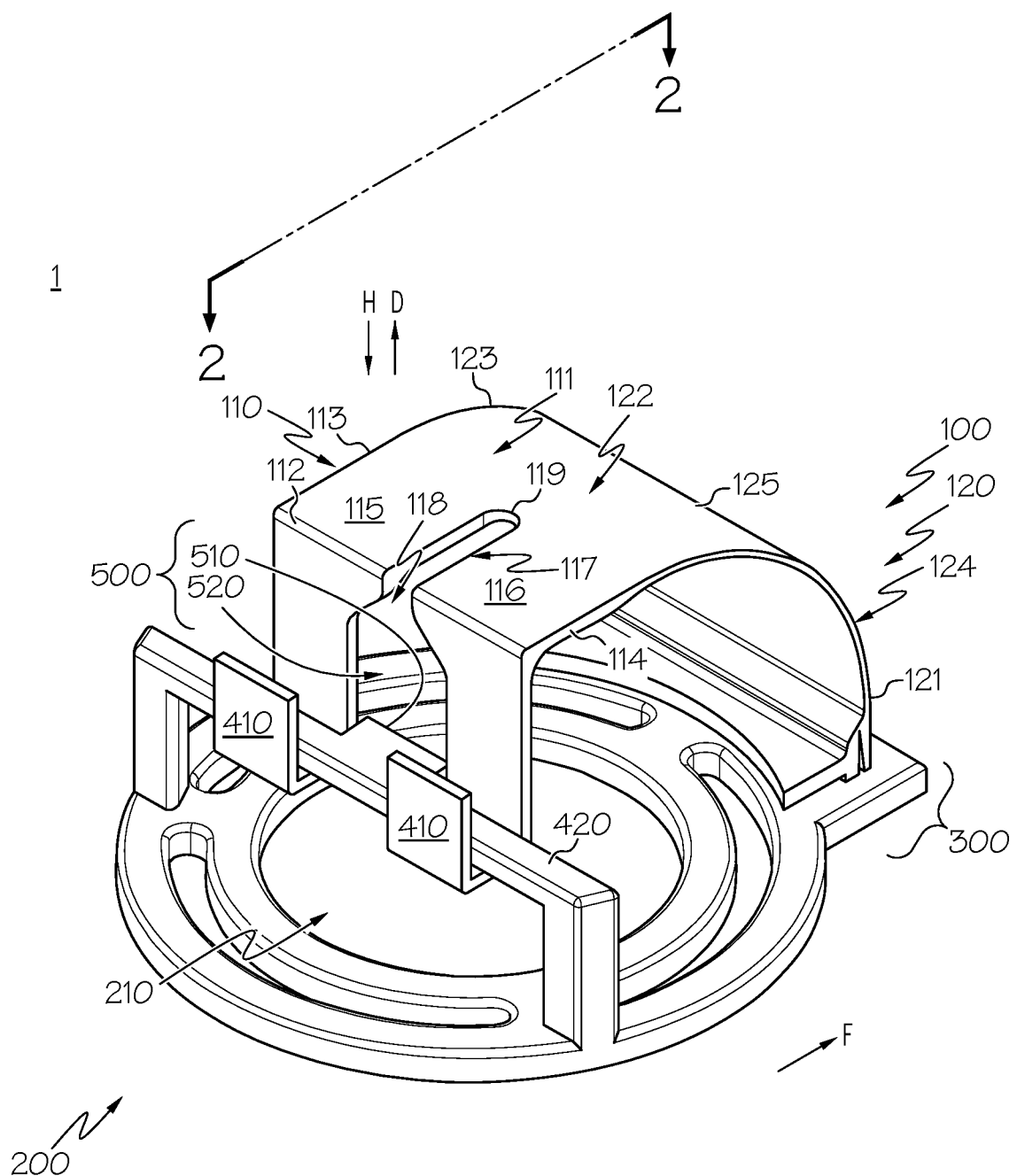
FIG. 1 is an isometric view of an exemplary stabilizing shoe in a locked state.
Figure 2:
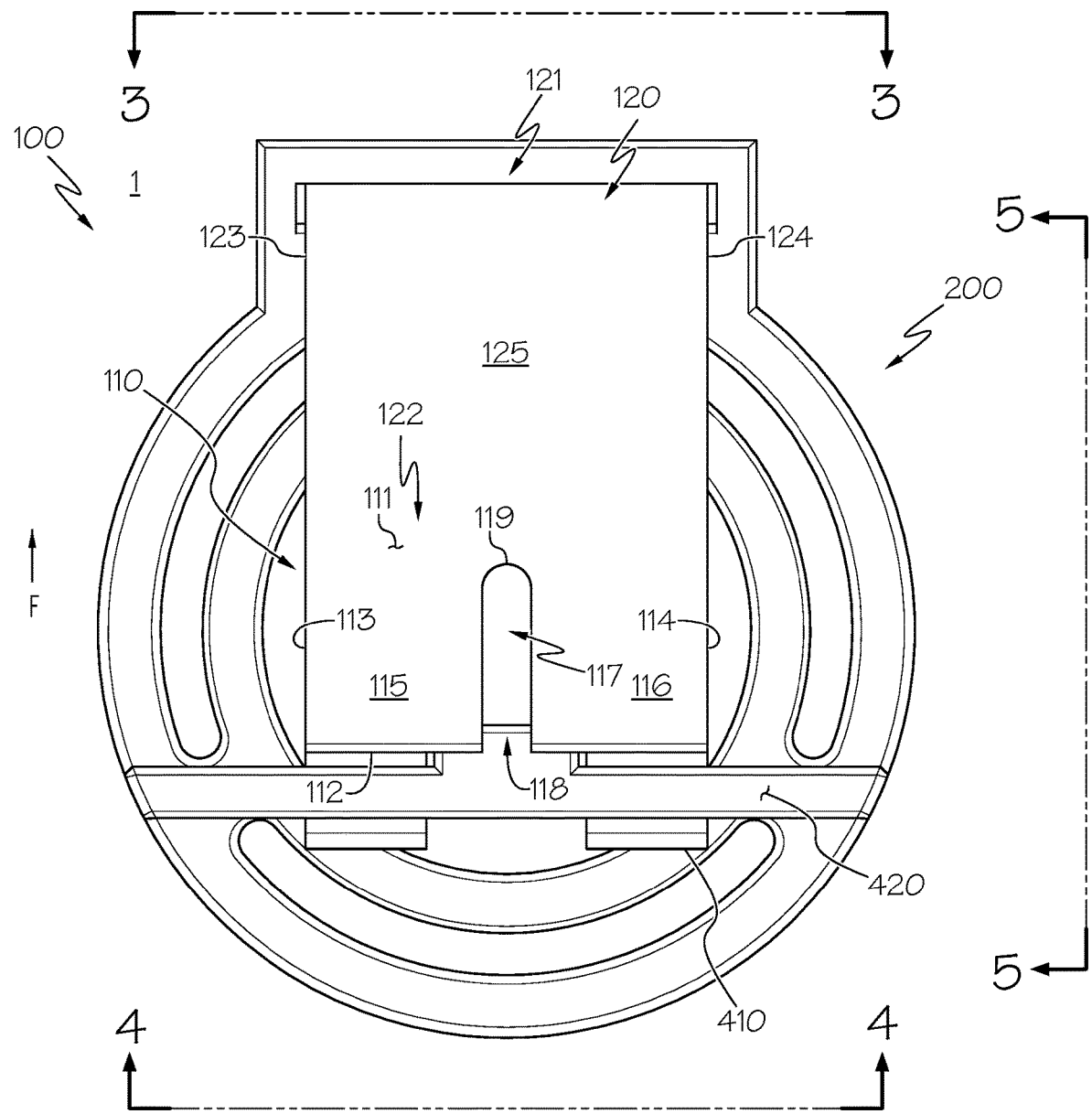
FIG. 2 is a top view of the stabilizing shoe in the locked state shown from 2-2 of FIG. 1.
Figure 3:
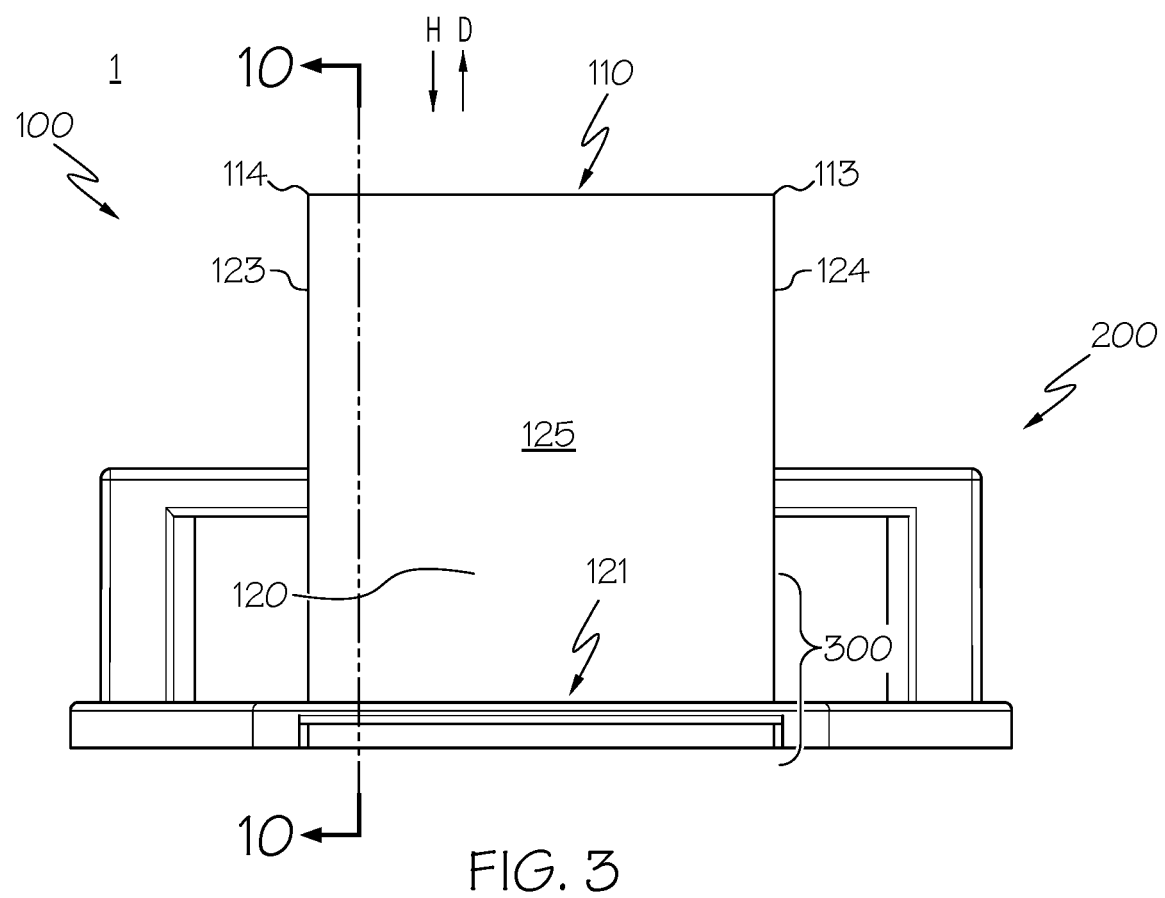
FIG. 3 is a front view of the stabilizing shoe in the locked state show from 3-3 of FIG. 2.
Figure 4:
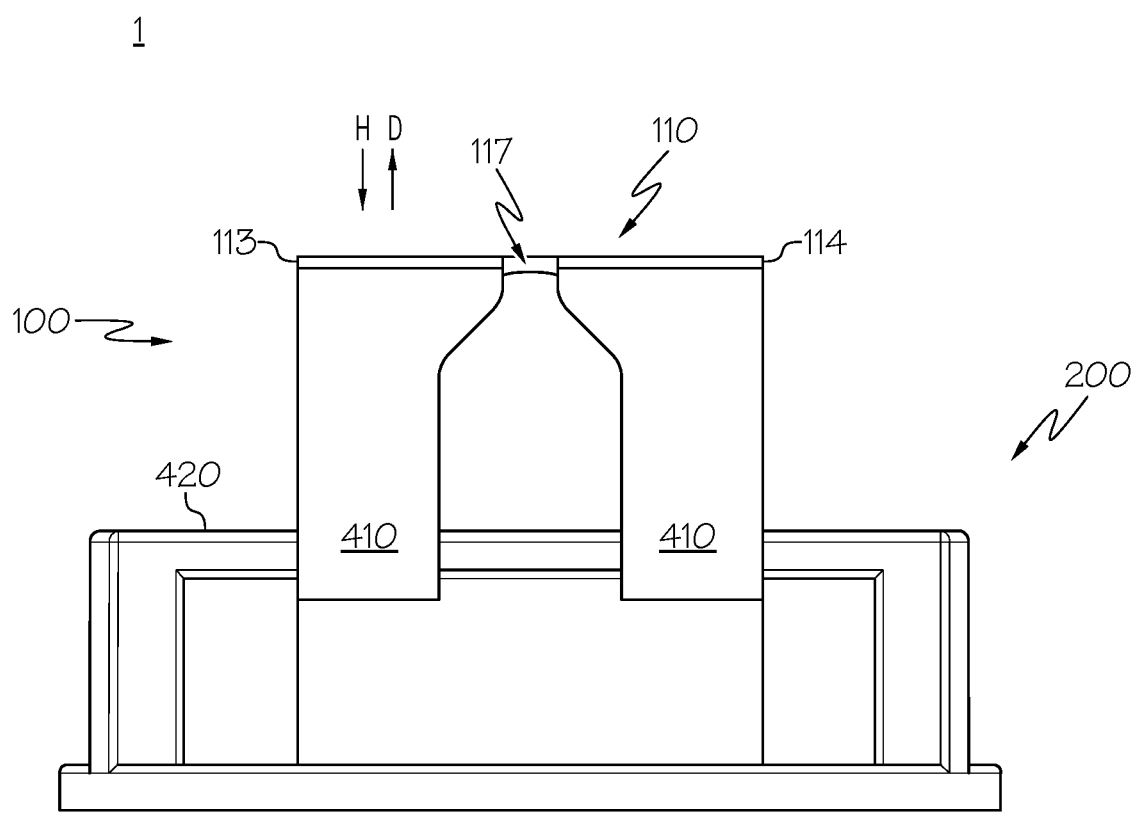
FIG. 4 is a back view of the stabilizing shoe in the locked state show from 4-4 of FIG. 2.
Figure 5:
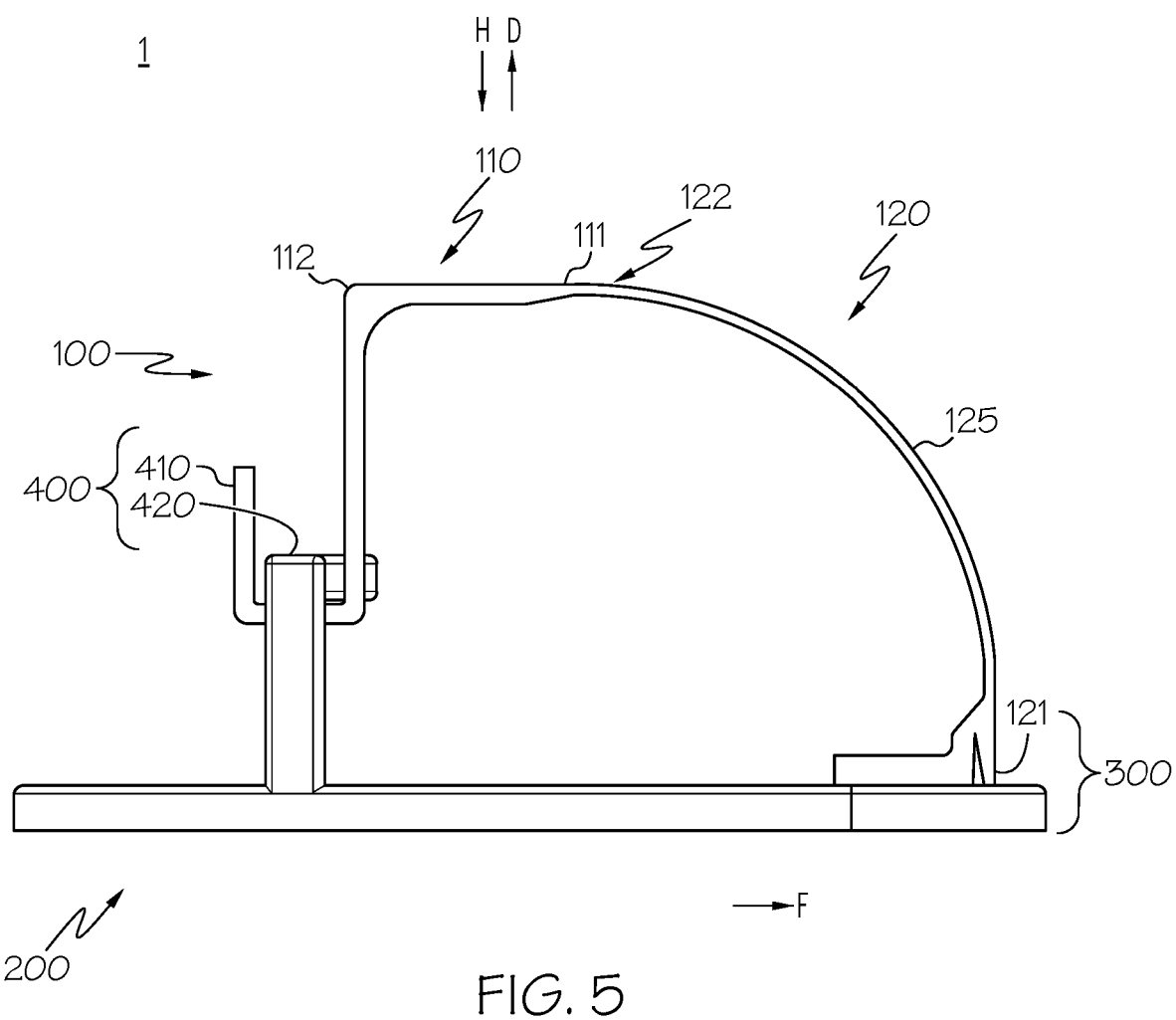
FIG. 5 is a right-side view of the stabilizing shoe in the locked state show from 5-5 of FIG. 2.
Figure 6:
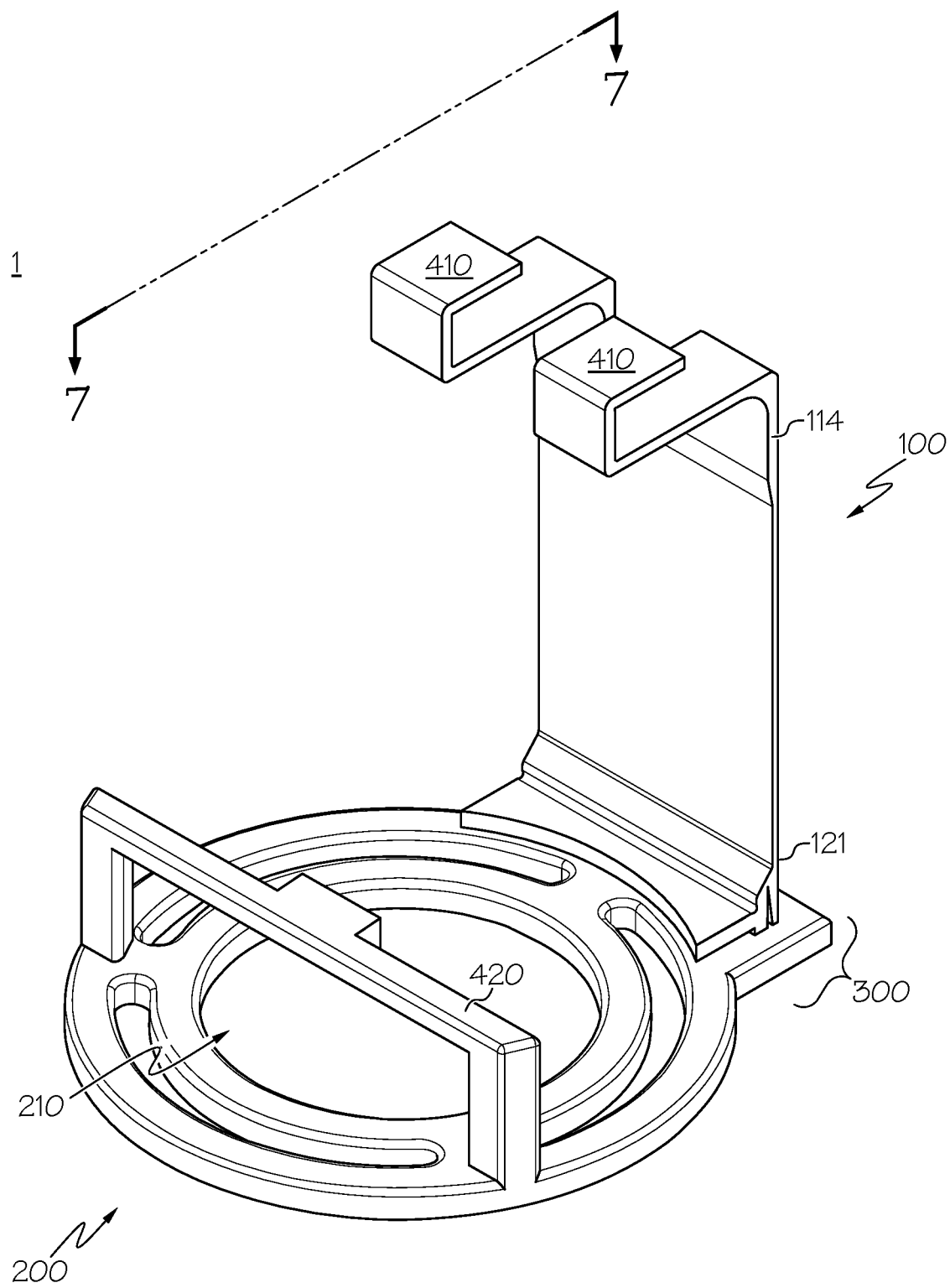
FIG. 6 is an isometric view of the stabilizing shoe of FIG. 1 in an unlocked state.

A stabilizing shoe for stabilizing a material to be processed includes a pressure foot having an engagement portion for pressing against the material to be processed; a mounting base; and a biasing portion linking the pressure foot and the mounting base. The biasing portion displaces the pressure foot displaces towards the mounting base upon application of a displacement force against the engagement portion and applies an opposing holding force in response to the displacement of the pressure foot.

The pressure foot includes any structure having an engagement portion for pressing against a material to be processed, and the biasing portion includes any structure that displaces towards the mounting base upon application of a displacement force against the engagement portion and applies an opposing holding force in response to the displacement of the pressure foot.

The biasing portion displaces the pressure foot upon application of the displacement force in any manner. In an example, the biasing portion displaces the pressure foot upon application of a displacement force against the engagement portion by way of an elasticity of the pressure foot. In another example, the biasing portion displaces the pressure foot by way of one or more hinges.

The biasing portion applies an opposing holding force in response to the displacement in any manner. In an example, the biasing portion applies an opposing holding force to the pressure foot by way of the elasticity of the pressure foot. In another example, biasing portion applies an opposing holding force to the pressure foot by way of springs. In yet other examples, the biasing portion applies an opposing holding force to the pressure foot by way of magnets or weights.

The biasing portion may include a guide portion for guiding a material to be processed to the engagement portion. The size, shape, and position of the guide portion depends on a number of variables. In an example, the guide portion is formed in the shape of a curved leaf spring.

The guide portion may be oriented in a forward direction of the pressure foot, the forward direction being the direction of the travel of the pressure foot with regard to the material to be processed. The guide portion may include a sloped surface to facilitate guiding the material to be processed to the engagement portion. The pressure foot may include, such as in the case of a two-directional processing tool (e.g., a bidirectional ultrasonic knife), a first guide portion for a guiding a material to be processed to the engagement portion from a first direction and a second guide portion for guiding a material to be processed to the engagement portion from a second direction.

The guide portion of the pressure foot may be elastically deformable such that the guide portion elastically deforms upon application of the displacement force against the engagement portion and thereby applies the opposing holding force in response to the elastic deformation. The engagement portion is inelastic or less elastic than the guide portion. In an example, the engagement portion has a greater thickness than the guide portion to provide for reduced elasticity relative to the guide portion. In another example, the engagement portion includes stiffening ribs to reduce elasticity relative to the guide portion.

The engagement portion of the pressure foot may define an opening therein through which a processing tool accesses the material to be processed. The size, shape, and position of the opening depends on a number of variables, such as a nature of the processing tool. In an example, the opening is centered with respect to opposing sections of the engagement portion of the pressure foot. In an example, the opening is symmetric with respect to the forward direction of the pressure foot.

The stabilizing shoe includes a mounting base. The mounting base is coupled to the pressure foot in any manner. In an example, the mounting base is coupled to the pressure foot by way of a snap-in connection. The snap-in connection may include male and female connector portions respectively located on the pressure foot and the mounting base, or vice versa. In another example, the mounting base is coupled to the pressure foot by way of a living hinge.

The mounting base may define an opening therein through which a processing tool accesses the material to be processed. The size, shape, and position of the opening depends on a number of variables, such as a nature of the processing tool. In an example, the opening is radially symmetric to permit adjustment of the stabilizing shoe with regard to a processing tool and direction of travel.

The mounting base may define one or more holes for mounting the mounting base to a processing device, e.g., a cutting device. The size, shape, and position of the holes depends on a number of variables, such as a nature of a connection between the mounting base and the processing device. In an example, the one or more holes include one or more slotted holes for adjustably mounting the mounting base to a processing device. The one or more slotted holes may extend in a circumferential direction around the opening through which the processing tool accesses the material to be processed to permit adjustment of the stabilizing shoe in a circumferential direction with regard to the processing tool and direction of travel.

The pressure foot and the mounting base may each include locking portions for locking against a displacement of the pressure foot away from the mounting base. In an example, the locking portions include hook and bar connectors respectively located on the pressure foot and the mounting base, or vice versa.

The pressure foot and the mounting base may include tab and groove connectors for limiting a shifting between the pressure foot and the mounting base. The tab connector may include a protrusion, and the groove connector may include a recess or opening configured to engaged with the protrusion of the tab connector. In an aspect, the tab and groove connectors are respectively located on the mounting base and the pressure foot, or vice versa. In another aspect, the groove connector and the hook connector are co-located on one of the pressure foot and the mounting base, and the tab connector and bar connector are co-located on the other of the pressure foot and the mounting base. In yet another aspect, the groove connector is an extension of the opening in the engagement portion through which the processing tool accesses the material to be processed. In yet another aspect, the tab connector is an extension from the bar connector.

The pressure foot and/or the mounting base may be manufactured from any suitable material. In an example, the pressure foot is manufactured from a thermoplastic material (e.g., fiber-reinforced thermoplastic material).

Figure 10:
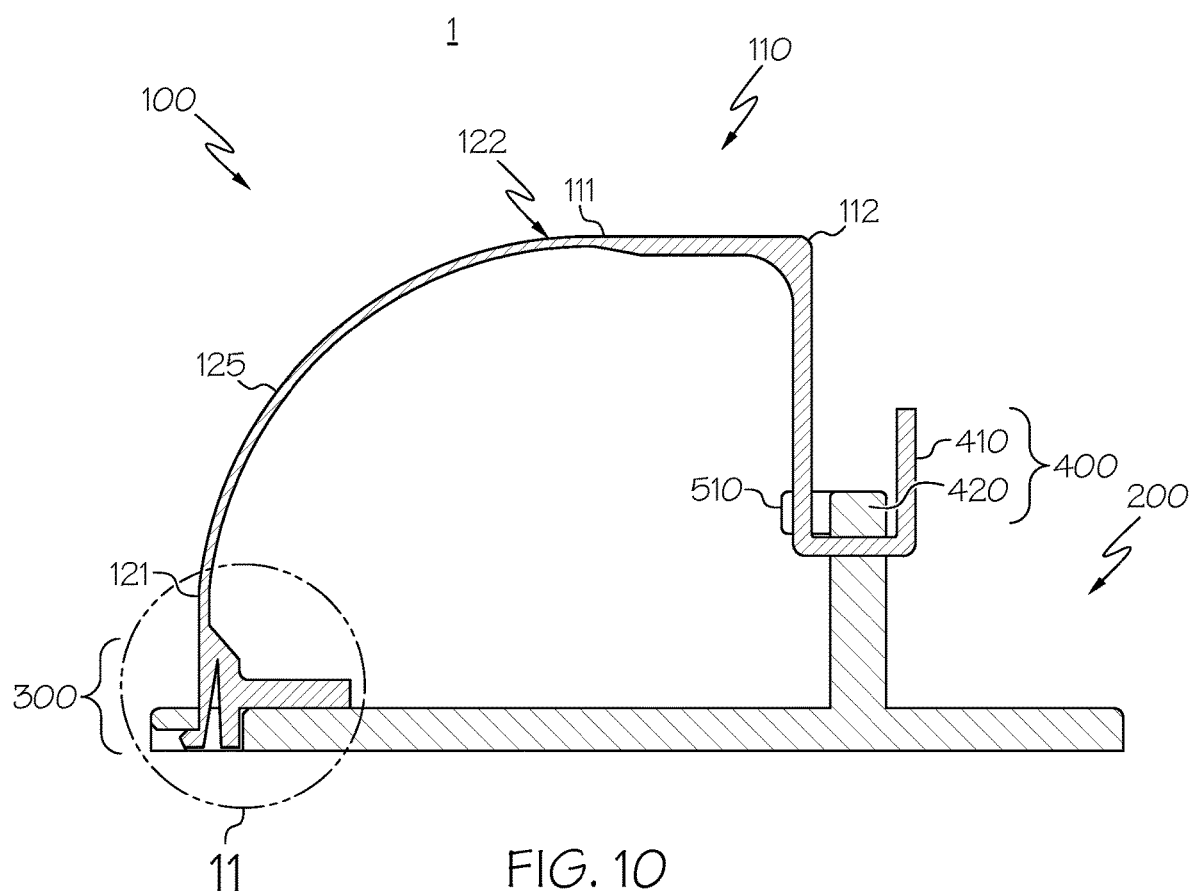
FIG. 10 is a cross-sectional view of the stabilizing shoe in the locked state along sectional line 10-10 of FIG. 3.
Figure 11:
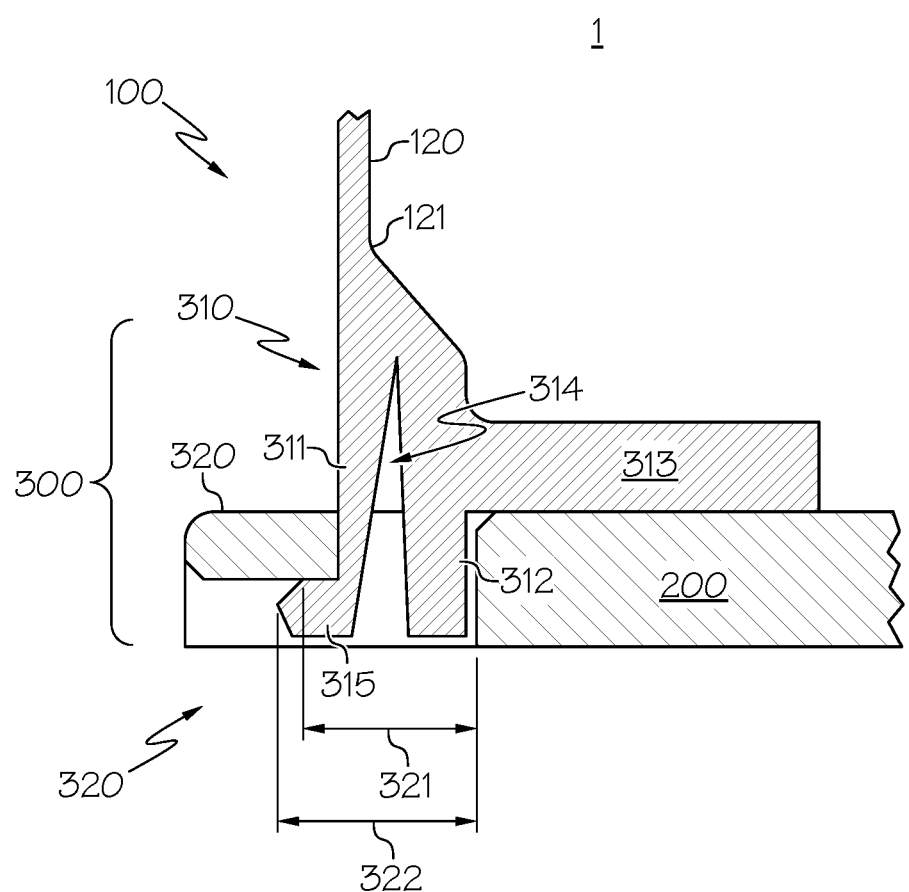
FIG. 11 is a magnified partial cross-sectional view of region 11 of FIG. 10.

FIGS. 1 to 11 illustrate an exemplary stabilizing shoe for stabilizing a material to be processed. In particular, FIGS. 1 to 5 illustrate the exemplary stabilizing shoe in a locked state, FIGS. 6 to 9 illustrate the exemplary stabilizing shoe in an unlocked state, and FIGS. 10 and 11 illustrate cross-sectional views of the exemplary stabilizing shoe. It should be understood that the present description is not limited to the features of the illustrated embodiment but may include any one or more of the illustrated features.

As shown in FIGS. 1-5, the stabilizing shoe 1 includes a pressure foot 100 and a mounting base 200; and a biasing portion 120. The pressure foot 100 includes an engagement portion 110 for pressing against a material to be processed. Upon application of a displacement force D against the engagement portion 110, the biasing portion 120 displaces the pressure foot 100 towards the mounting base 200 and applies an opposing holding force H (shown on FIGS. 1 and 3-5) in response to the displacement of the pressure foot.

The engagement portion 110 includes a forward end 111 of the pressure foot 100, a rear end 112 opposite to the forward end 111, a left end 113, and a right end 114. The engagement portion 110 includes at least one flat engagement portion 115, 116 for pressing against a material to be processed. The engagement portion 110 of the pressure foot 100 defines an opening 117 therein through which a processing tool accesses the material to be processed. The opening 117 is centered with respect to the at least one flat engagement portion 115, 116 of the engagement portion 110 of the pressure foot 100, and the opening 117 is symmetric with respect to a forward direction F (shown on FIGS. 1, 2, and 5) of the pressure foot 100, the forward direction F being the direction of the travel of the pressure foot 100 with regard to the material to be processed. As shown, the opening 117 is defined in the shape of an elongated slot extending parallel to the forward direction F, and the opening has a rear open end 118 and forward closed end 119 defined in the shaped of a semicircle.

The biasing portion 120 may be in the form of a guide portion for guiding a material to be processed to the engagement portion 110. The guide portion is oriented in a forward direction F of the pressure foot 100, the forward direction F being the direction of the travel of the pressure foot 100 with regard to the material to be processed. The guide portion includes a forward end 121 with respect to a forward direction F of the pressure foot 100, a rear end 122 opposite to the forward end 121, a left end 123 and a right end 124. The rear end 122 of the guide portion is coupled to the forward end 111 of the engagement portion 110.

The guide portion of the pressure foot 100 is elastically deformable. Upon application of the displacement force D against the engagement portion 110, the guide portion elastically deforms to permit a displacement of the engagement portion 110, and a stress accumulated in the elastically deformed guide portion applies an opposing holding force H in response to the elastic deformation.

The guide portion further includes a sloped surface 125 to facilitate guiding the material to be processed to the engagement portion 110. The guide portion is formed in the shape of a curved leaf spring.

The engagement portion 110 is less elastic than the guide portion. As shown, the engagement portion 110 has a greater thickness than the guide portion to provide for reduced elasticity relative to the guide portion.

The stabilizing shoe 1 further includes a mounting base 200 coupled to the pressure foot 100. The pressure foot 100 is coupled to the mounting base 200 by way of a snap-in connection 300. As shown in the sectional views of FIGS. 10 and 11, the snap-in connection 300 includes a male connector portion 310 at a forward end 121 of the guide portion and a female connector portion 320 at the mounting base 200. The male connector portion 310 includes a first extending member 311, a second extending member 312, a third extending member 313, and a gap 314 separating the first extending member 311 and the second extending member 312. The gap 314 permits a compression to be applied between the first extending member 311 and a second extending member 312. The third extending member 313 permits the guide portion to be elastically deformed without compromising the snap-in connection 300.

The first extending member 311 includes a bead 315 protruding from the first extending member 311. The female connector portion 320 includes a port 321 and a cavity 322. The size of the port 321 is sufficient in size to pass the first extending member 311 having the protruding bead 315 and a second extending member 312 while in the compressed state but insufficient in size to pass the first extending member 311 having the protruding bead 315 and a second extending member 312 while in the uncompressed state. The size of the cavity 322 is sufficient to hold the first extending member 311 having the protruding bead 315 and a second extending member 312 while in the uncompressed state. Thus, the pressure foot 100 and the mounting base 200 are releasably coupled by way of the snap-in connection 300. The releasable coupling of the pressure foot 100 and the mounting base 200 permits for removal and replacement of the pressure foot 100 in case of, for example, an erosion of performance of the pressure foot 100 or a desired change in performance requirements of the pressure foot 100.

The mounting base 200 defines an opening 210 therein through which a processing tool accesses the material to be processed. The opening 210 is radially symmetric to permit adjustment of the stabilizing shoe 1 with regard to a processing tool and direction of travel.

Figure 7:
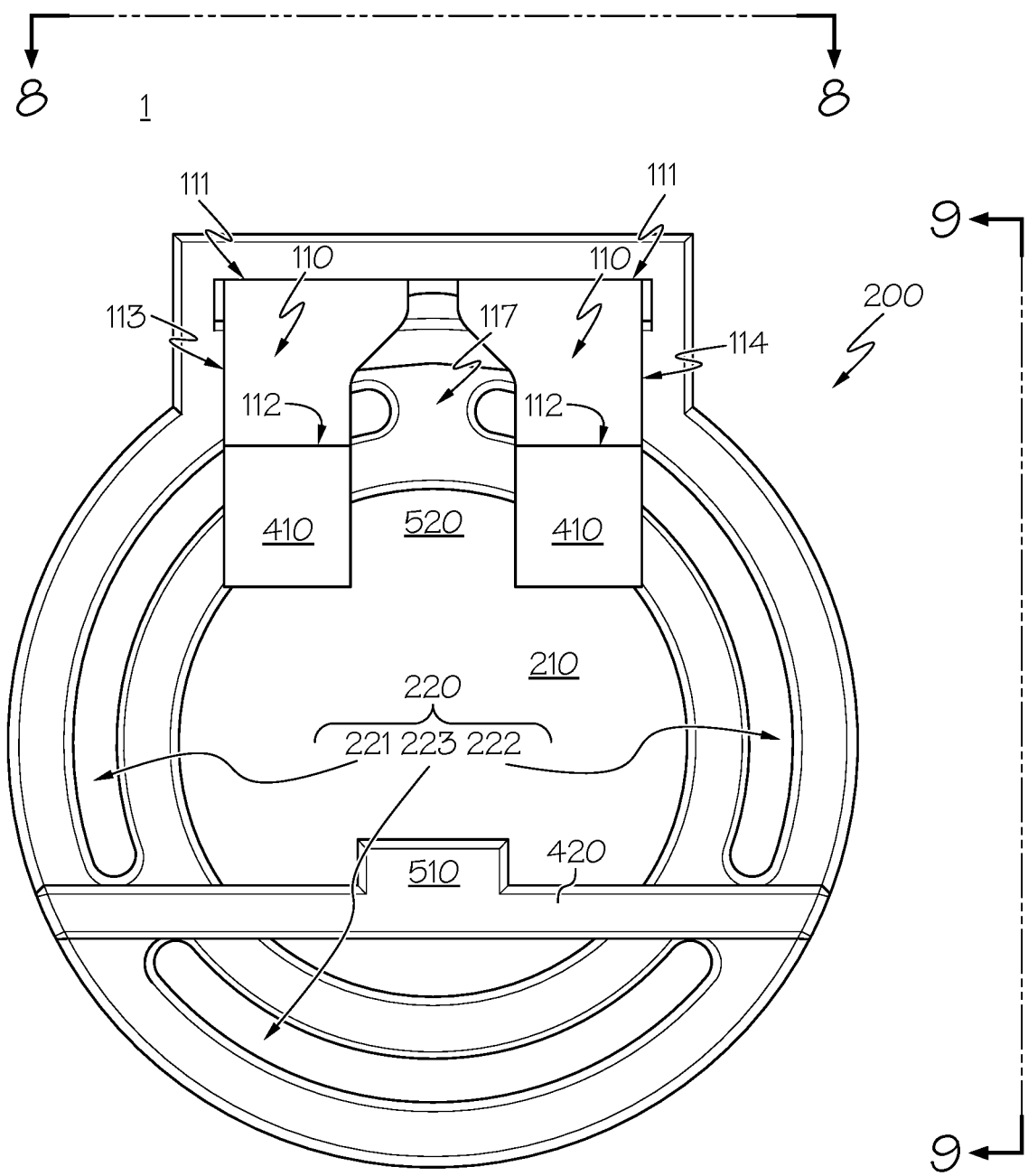
FIG. 7 is a top view of the stabilizing shoe in the unlocked state shown from 7-7 of FIG. 6.
Figure 8:
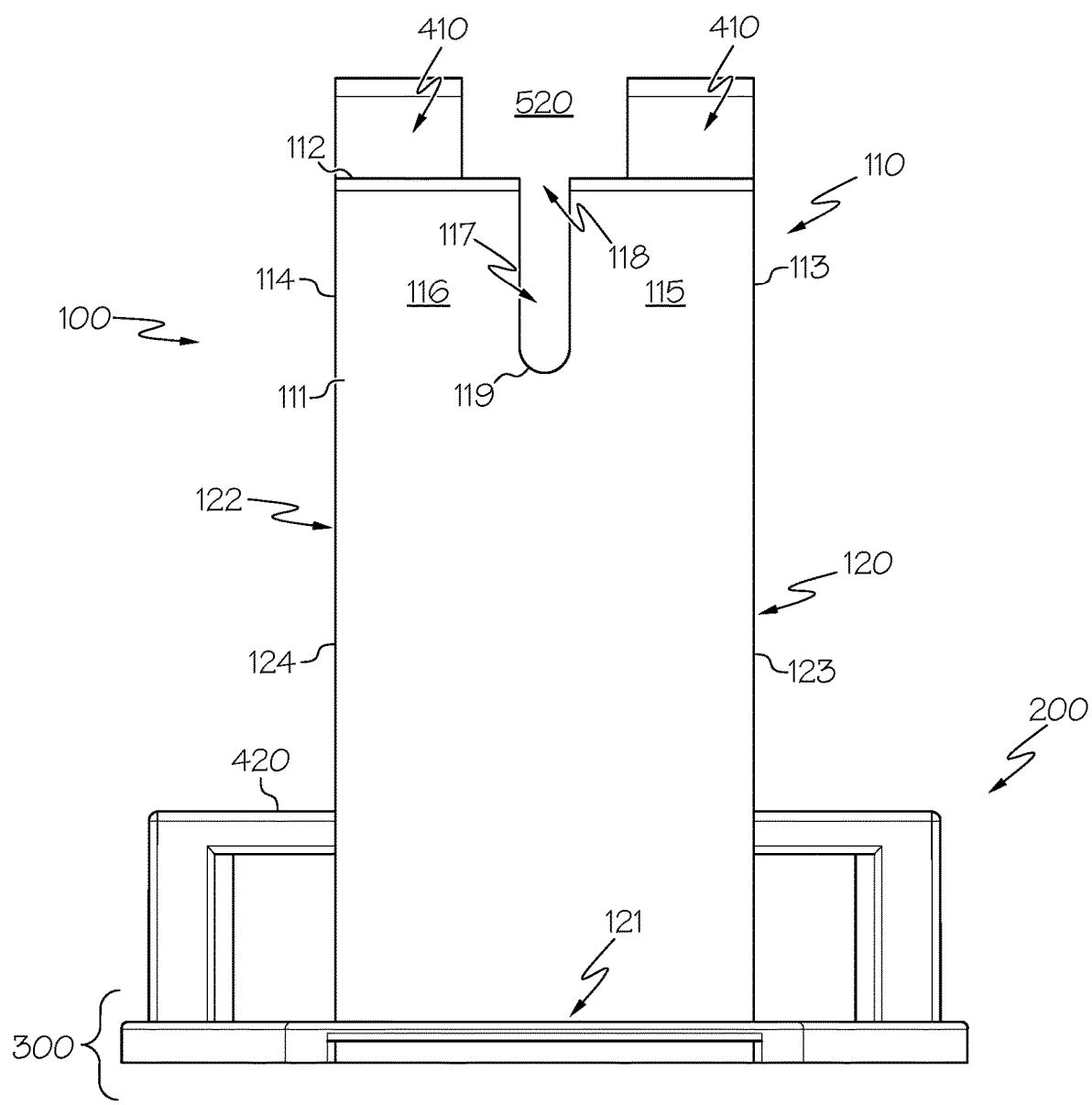
FIG. 8 is a front view of the stabilizing shoe in the unlocked state shown from 8-8 of FIG. 7.
Figure 9:
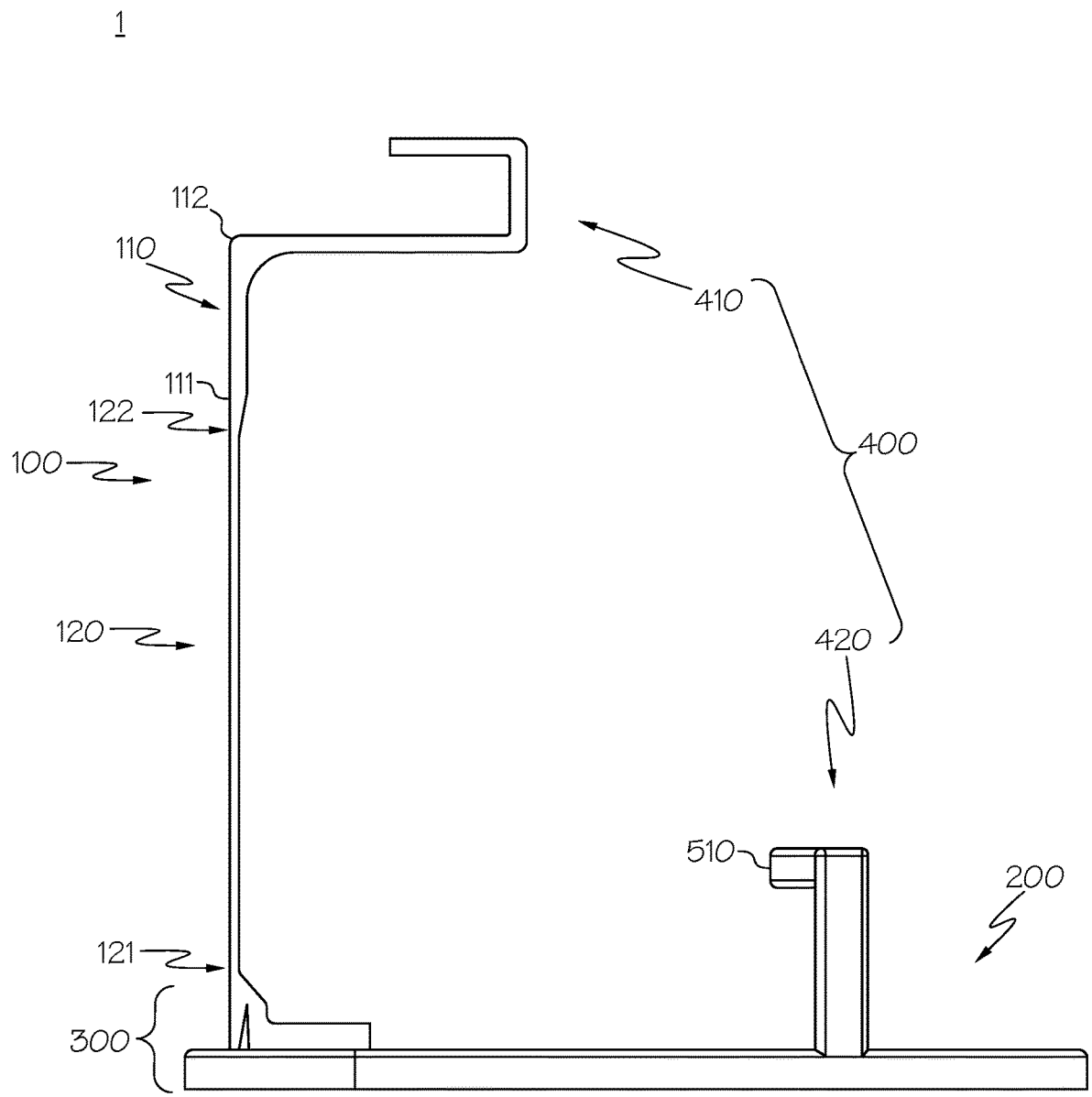
FIG. 9 is a right-side view of the stabilizing shoe in the unlocked state shown from 8-8 of FIG. 7.

The mounting base 200 defines a plurality of holes 220 for mounting the mounting base to a processing device. The plurality of holes 220 includes a first slotted hole 221, a second slotted hole 222, and a third slotted hole 223. The plurality of holes 220 allows for insertion of a fastener for fastening to a processing device. The slotted nature of the plurality of holes 220 permits for adjustably mounting the mounting base to the processing device. As shown in FIG. 7, the first slotted hole 221, the second slotted hole 222, and the third slotted hole 223 extend in a circumferential direction around the opening 210 through which the processing tool accesses the material to be processed to permit adjustment of the stabilizing shoe 1 in a circumferential direction with regard to the processing tool and direction of travel.

The pressure foot 100 and the mounting base 200 each include locking portions 400 for locking against a displacement of the pressure foot 100 away from the mounting base 200. The locking portions 400 include a hook connector 410 located at a rear end 112 of the engagement portion 110 of the pressure foot 100 and a bar connector 420 on the mounting base 200.

As shown in FIGS. 6 to 9, the pressure foot 100 is manufactured such that the guide portion is straight in an unstressed condition. When locking the pressure foot 100 to the mounting base 200, the guide portion is elastically deformed, thereby providing for the sloped surface 125. The elastic deformation of the guide portion provides for a build-up of stress in the guide portion, thereby providing for the holding force H. By locking against a displacement of the pressure foot 100 away from the mounting base 200, the locking portions 400 prevent the stress built-up in the guide portion from returning the guide portion to its original straight configuration while permitting the pressure foot 100 to displace towards the mounting base upon application of a displacement force D against the engagement portion 110

The pressure foot 100 and the mounting base 200 further include tab and groove connectors 500 for limiting a shifting between the pressure foot 100 and the mounting base 200. The tab and groove connectors 500 include a tab connector 510 in the form of a protrusion located on the bar connector 420 and a groove connector 520 in the form of an opening located on the hook connector 410. The groove connector 520 is an extension of the opening 117 in the engagement portion 110 through which the processing tool accesses the material to be processed. By insertion of the tab connector 510 into the groove connector 520, a shifting between the pressure foot 100 and the mounting base 200 is prevented in a direction perpendicular to a direction of travel.

The pressure foot and/or the mounting base may be additively manufactured in a layer-by-layer process. In an aspect, a build direction of the pressure foot additively manufactured in a layer-by-layer process is perpendicular to the forward direction of the pressure foot to maximize mechanical properties.

FIGS. 12A to 12C are perspective views of a pressure foot showing an exemplary build direction during a layer-by-layer additive manufacturing process of the pressure foot 100 of the exemplary stabilizing shoe of FIGS. 1 to 11. As illustrated in FIGS. 12A to 12C, the pressure foot 100 is additively manufactured in a layer-by-layer direction over time, and a build direction B of the pressure foot 100 is oriented with a thickness direction of the pressure foot 100, the thickness direction being perpendicular to the forward direction of the pressure foot.

In particular, FIG. 12A shows a start of a pressure foot 100 being built by an additive manufacturing process, FIG. 12B shows the pressure foot 100 at a middle of the additive manufacturing process, and FIG. 12C shows the pressure foot 100 at an end of the additive manufacturing process. When the build direction B is oriented in the thickness direction of the pressure foot 100, the mechanical properties of the pressure foot 100 are maximized with respect to stresses applied to the engagement portion 110, are maximized with respect to the guide portion, are maximized with respect to the coupling (e.g., snap-in connection 300) of the pressure foot 100 to the mounting base 200, and are maximized with respect to the hook connector 410.

According to the present description, a manufacturing apparatus includes a processing device for processing a material; a pressure foot having an engagement portion for pressing against the material to be processed; and a biasing portion linking the processing device and the pressure foot. The pressure foot displaces towards the processing device upon application of a displacement force against the engagement portion and applies an opposing holding force in response to the displacement of the pressure foot. The processing device may be a cutting device for cutting a material.

In an example, the manufacturing apparatus further includes a mounting base, as previously or hereafter described, coupled with the pressure foot and mounted to the processing device. In another example, the pressure foot is directly affixed to the processing device without an intermediate mounting base.

Thus, a structure of the processing device may substitute for the mounting base and may include any of the features of the mounting base as previously or hereafter described. Accordingly, in an aspect, the pressure foot is coupled to the processing device by way of a snap-in connection that includes male and female connector portions respectively located on the pressure foot and the processing device, or vice versa. In another aspect, the pressure foot and the processing device include locking portions for locking against a displacement of the pressure foot away from the processing device. In yet another aspect, the pressure foot and the processing device include tab and groove connectors for limiting a shifting between the pressure foot and the processing device.

The processing device may include any processing device (e.g., cutting device) which may benefit from stabilization of the material being processed. In an example, the processing device includes a cutting head of a multifunction end effector. In another example, the processing device includes an ultrasonic cutting device (e.g., ultrasonic knife).

FIGS. 13 to 19 and the associated description illustrate and describe an exemplary manufacturing apparatus and manufacturing method, in particular a multifunction end effector apparatus and method for manufacturing using the multifunction end effector apparatus, that includes a processing device for processing a material and a pressure foot according to one or aspects as described above. It should be understood that the present description is not limited to the features of the exemplary manufacturing apparatus and manufacturing method but may include any one or more of the features thereof.

Figure 13:
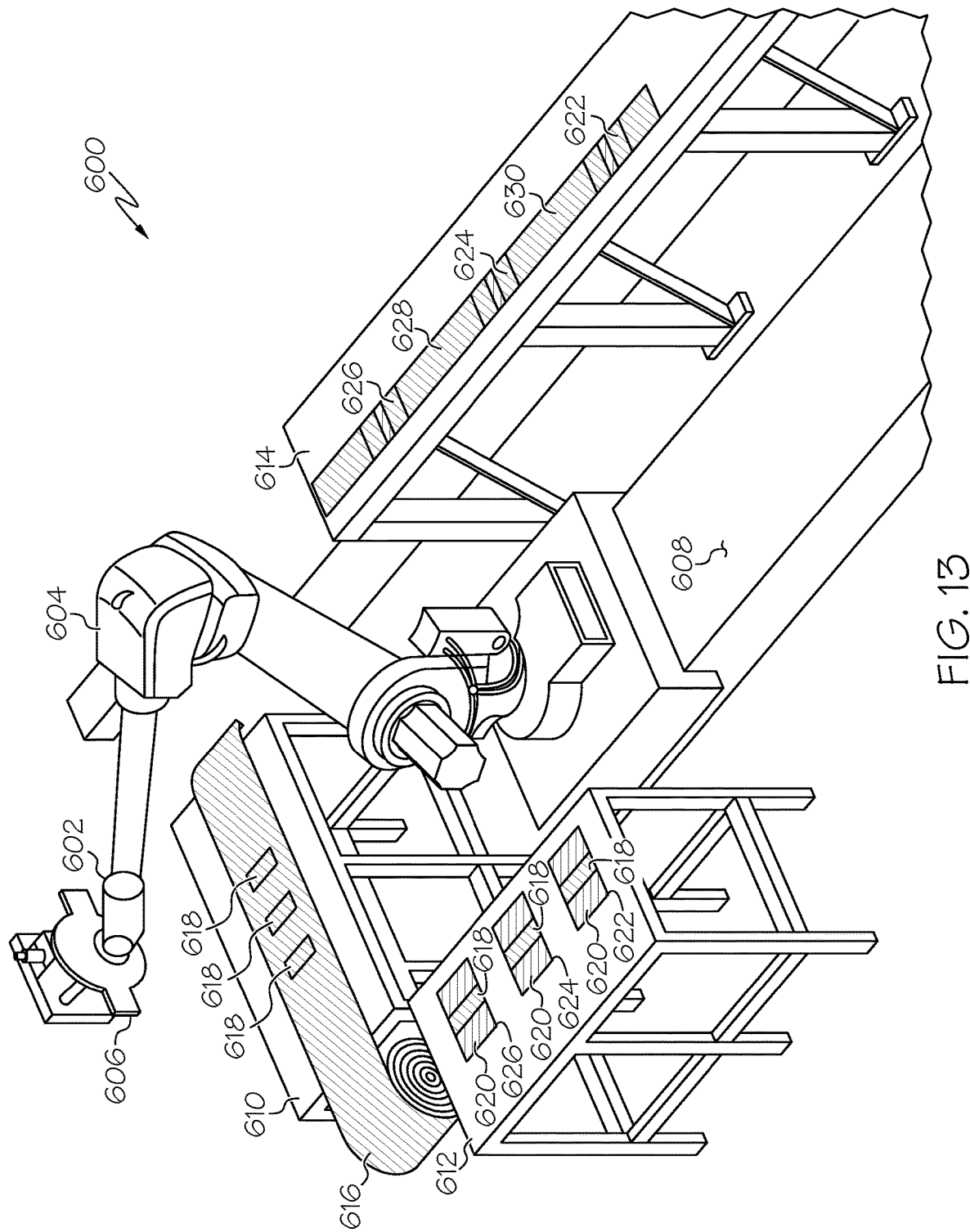
FIG. 13 illustrates an exemplary environment of use in which an exemplary manufacturing apparatus may be implemented.

FIG. 13 illustrates an exemplary environment of use 600 in which a multifunction end effector apparatus 602 for assembling fiber-reinforced thermoplastic composite articles may be implemented. The multifunction end effector apparatus 602 includes a robot 604 and an end effector 606 coupled to the robot 604. In the illustrated example, the robot 604 is a jointed arm six-axis robot capable of moving (e.g., translating, rotating, etc.) the end effector 606 into various positions and/or locations within the environment of use 600. In addition to the six degrees of freedom associated with the six axes of the robot 604, the robot 604 is also movable (e.g., slidable) along an exemplary rail 608. Movement of the robot 604 along the rail 608 improves the range of motion of the robot 604 within the environment of use 600.

The end effector 606 includes a plurality of functional heads to respectively perform one or more functions, operations and/or processes associated with assembling one or more fiber-reinforced thermoplastic articles. In an aspect, the end effector 606 includes a cutting head having an ultrasonic cutter (e.g., an ultrasonic knife) to cut one or more thermoplastic parts from a fiber-reinforced thermoplastic material. In another aspect, the end effector 606 further includes a vacuum head having a vacuum surface to selectively pick up one or more cut thermoplastic parts (e.g., cut fiber-reinforced thermoplastic parts) in response to a vacuum force applied at the vacuum surface. In yet another aspect, the end effector 606 additionally includes a welding head having an ultrasonic welder (e.g., an ultrasonic tack welder) to weld one part to another part to form a thermoplastic sub-assembly and/or a finished thermoplastic article (e.g., a fiber-reinforced thermoplastic sub-assembly and/or a fiber-reinforced finished thermoplastic article).

The robot 604 is controlled and/or programmed to move one or more desired functional heads (e.g., the cutting head, the vacuum head and/or the welding head) of the end effector 606 into contact with one or more thermoplastic workpieces (e.g., fiber-reinforced thermoplastic workpieces) in conjunction with assembling a thermoplastic composite article (e.g., fiber-reinforced thermoplastic composite article).

As illustrated in FIG. 13, the environment of use 600 further includes a material presentation table 610, a sub-assembly table 612, and a finished composite article table 614. A thermoplastic material 616, e.g., fiber-reinforced thermoplastic material, is presented at the material presentation table 610. In some examples, the thermoplastic material 616 may be a single sheet and/or lamina ply. In other examples, the thermoplastic material 616 may include multiple sheets and/or plies arranged in a stacked configuration. In other example, parts being processed have a fiber reinforcement orientated to a particularly desired orientation, with potentially different fiber orientations from lamina ply to lamina ply or within a given lamina ply. In yet another example, parts being processed have a fiber reinforcement orientated to a particularly desired orientation, with potentially different fiber orientations from lamina ply to lamina ply or within a given lamina ply.

The robot 604 moves the cutting head of the end effector 606 into contact with the fiber-reinforced thermoplastic material 616, and may further direct and/or cause the cutting head to cut one or more thermoplastic parts 618 from the fiber-reinforced thermoplastic material 616.

After the fiber-reinforced thermoplastic material 616 has been cut by the cutting head of the end effector 606, the robot 604 subsequently moves the vacuum head of the end effector 606 into contact with one or more of the thermoplastic parts 618 located at the material presentation table 610, and the vacuum head picks up one or more of the thermoplastic parts 618 from the material presentation table 610. While the vacuum head of the end effector 606 is holding the one or more thermoplastic parts 618, the robot 604 subsequently moves the vacuum head from the material presentation table 610 to the sub-assembly table 612, and the vacuum head positions the one or more thermoplastic parts 618 on the sub-assembly table 612. A vacuum in material presentation table 610 would only hold down a ply in contact and would rely upon interply tack or adhesion to hold subsequent applied plies to the ply sitting directly upon material presentation table 610.

After the one or more thermoplastic parts 618 have been positioned at the sub-assembly table 612 by the vacuum head of the end effector 606, the robot 604 subsequently moves the welding head of the end effector 606 into contact with a first one of the thermoplastic parts 618, and further direct and/or cause the welding head to weld the first thermoplastic part 618 to a second thermoplastic part 620 to form a thermoplastic sub-assembly. The welding head may include an ultrasonic welder (e.g., an ultrasonic tack welder) to weld (e.g., tack) one thermoplastic part to another thermoplastic part to form a thermoplastic composite article.

Multiple thermoplastic sub-assemblies (e.g., fiber-reinforced respectively having any number of thermoplastic parts may be formed at the sub-assembly table 612. For example, a first example thermoplastic sub-assembly 622, a second thermoplastic sub-assembly 624, and a third example thermoplastic sub-assembly 626 are shown at the sub-assembly table 612. In some examples, one or more of the thermoplastic sub-assemblies formed at the sub-assembly table 612 constitute a finished thermoplastic composite article. In other examples, one or more of the thermoplastic sub-assemblies formed at the sub-assembly table 612 are subsequently joined (e.g., welded) to another thermoplastic part and/or another thermoplastic sub-assembly to form a finished thermoplastic composite article.

Following the formation of the first thermoplastic sub-assembly 622, e.g., first fiber-reinforced thermoplastic sub-assembly, at the sub-assembly table 612 as described above, the robot 604 subsequently moves the vacuum head of the end effector 606 into contact with the first thermoplastic sub-assembly 622 located at the sub-assembly table 612, and the vacuum head picks up the first thermoplastic sub-assembly 622 from the sub-assembly table 612. While the vacuum head of the end effector 606 is holding the first thermoplastic sub-assembly 622, the robot 604 move the vacuum head from the sub-assembly table 612 to the finished composite article table 614, and the vacuum head positions the first thermoplastic sub-assembly 622 at a location on the finished composite article table 614. In some examples, the robot 604 directs and/or causes the vacuum head to position the first thermoplastic sub-assembly 622 onto another thermoplastic part 628 already positioned on the finished composite article table 614.

After the first thermoplastic sub-assembly 622, e.g., first fiber-reinforced thermoplastic sub-assembly, has been positioned at the finished composite article table 614 by the vacuum head of the end effector 606, the robot 604 subsequently moves the welding head of the end effector 606 into contact with the first thermoplastic sub-assembly 622, and the welding head welds the first thermoplastic sub-assembly 622 to the other thermoplastic part 628. Multiple thermoplastic sub-assemblies (e.g., the first thermoplastic sub-assembly 622 and the second thermoplastic sub-assembly 624) may be welded to the other thermoplastic part 628 to form an exemplary finished thermoplastic composite article 630.

The multifunction end effector apparatus 602 may perform the above-described cutting, picking up, moving, placing, and welding functions, operations and/or processes in any order and/or sequence in the course of assembling one or more thermoplastic composite articles (e.g., one or more fiber-reinforced thermoplastic articles). Furthermore, the environment of use 600 in which the multifunction end effector apparatus 602 operates may include additional, fewer and/or different types of tables relative to the material presentation table 610, the sub-assembly table 612 and/or the finished composite article table 614 described above.

Figure 14:
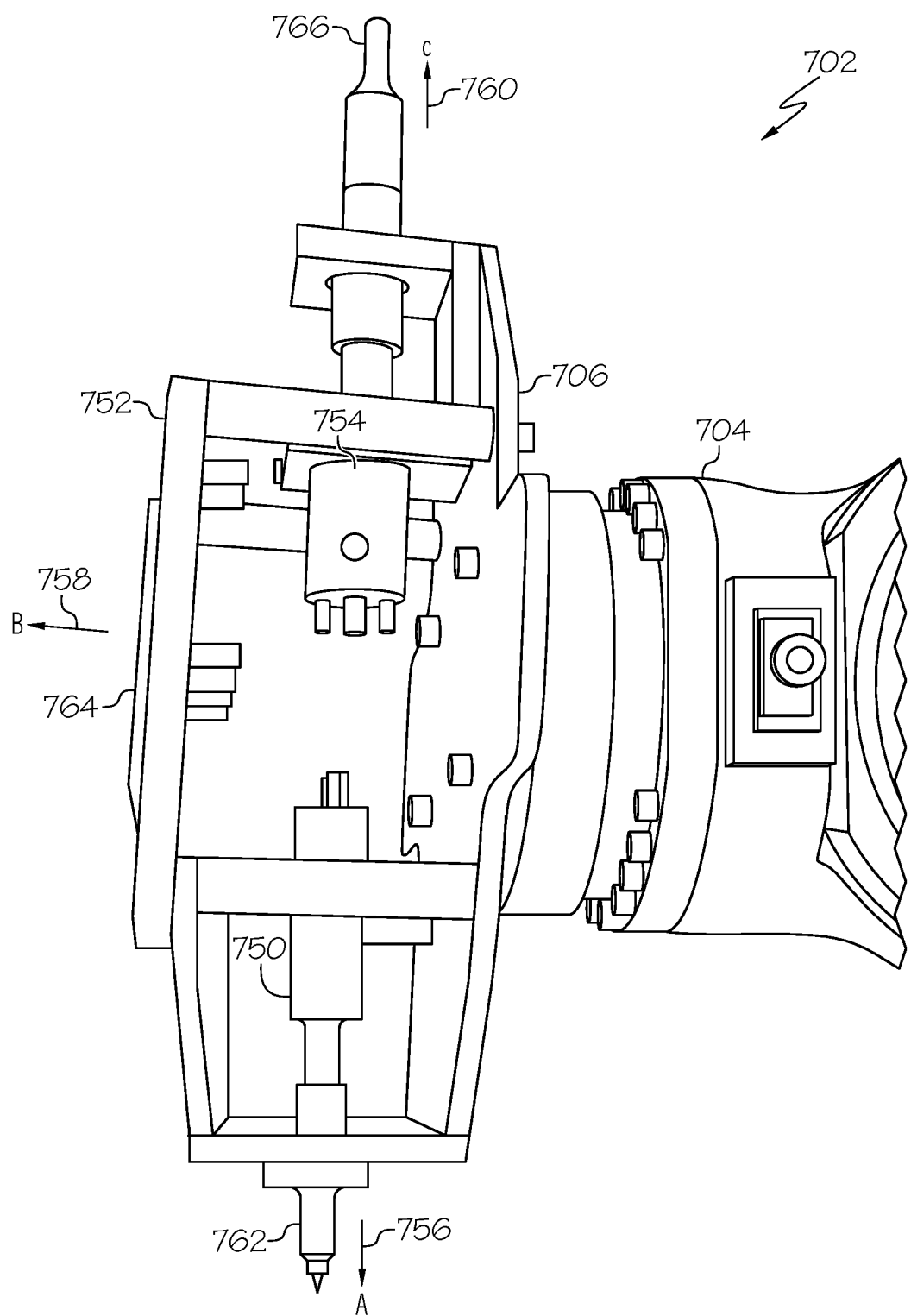
FIG. 14 is a perspective view of an exemplary manufacturing apparatus.

FIG. 14 is a perspective view of a multifunction end effector apparatus for assembling thermoplastic composite articles, e.g., fiber-reinforced thermoplastic articles. The exemplary multifunction end effector apparatus may be implemented in an environment of use such as the exemplary environment of use 600 of FIG. 13 described above.

The multifunction end effector apparatus 702 includes a robot 704 and an end effector 706 coupled to the robot 704. In the illustrated example, the robot 704 is a jointed arm six-axis robot capable of moving (e.g., translating, rotating, etc.) the end effector 706 into various positions and/or locations within an environment of use.

The end effector 706 includes a plurality of functional heads to respectively perform one or more functions, operations and/or processes associated with assembling one or more thermoplastic composite articles (e.g., one or more fiber-reinforced thermoplastic composite articles). More specifically, the end effector 706 includes a cutting head 750, a vacuum head 752, and a welding head 754. The cutting head 750 is operatively positioned on the end effector 706 in a first direction generally indicated by a first example directional arrow 756 referenced as directional arrow "A". The vacuum head 752 is operatively positioned on the end effector 706 in a second direction generally indicated by a second example directional arrow 758 referenced as directional arrow "B". The welding head 754 is operatively positioned on the end effector 706 in a third direction generally indicated by a third example directional arrow 760 referenced as directional arrow "C". As shown, the first direction (e.g., directional arrow "A") at which the cutting head 750 is operatively positioned on the end effector 706 is opposite the third direction (e.g., directional arrow "C") at which the welding head 754 is operatively positioned on the end effector 706. Furthermore, the second direction (e.g., directional arrow "B") at which the vacuum head 752 is operatively positioned on the end effector 706 is generally orthogonal to the first direction (e.g., directional arrow "A") at which the cutting head 750 is operatively positioned on the end effector 706, as well as the third direction (e.g., directional arrow "C") at which the welding head 754 is operatively positioned on the end effector 706.

The cutting head 750 of the end effector 706 includes an ultrasonic cutter 762 (e.g., an ultrasonic knife) to cut one or more thermoplastic parts (e.g., one or more fiber-reinforced thermoplastic parts). The ultrasonic cutter 762 and/or, more generally, the cutting head 750 may be powered, controlled and/or operated by an ultrasonic power supply. In some examples, the ultrasonic power supply is mounted to and/or on the end effector 706 and/or the robot 704 of the multifunction end effector apparatus 702. In other examples, the ultrasonic power supply is positioned at a remote location relative to the end effector 706 and/or the robot 704 of the multifunction end effector apparatus 702.

The vacuum head 752 of the end effector 706 includes a vacuum surface 764 to selectively pick up and/or hold one or more thermoplastic parts (e.g., one or more fiber-reinforced thermoplastic parts). The vacuum head 752 is to hold one or more thermoplastic parts in place relative to the vacuum surface 764 while the one or more thermoplastic parts is/are moved from a first location to a second location.

The welding head 754 of the end effector 706 includes an ultrasonic welder 766 (e.g., an ultrasonic tack welder) to weld (e.g., tack) one thermoplastic part to another thermoplastic part to form a thermoplastic composite article (e.g., a fiber-reinforced thermoplastic composite article).

The robot 704 is controllable and/or programmable to move any one of the ultrasonic cutter 762 of the cutting head 750, the vacuum surface 764 of the vacuum head 752, or the ultrasonic welder 766 of the welding head 754 into contact with one or more thermoplastic workpieces at any given time in conjunction with assembling a thermoplastic composite article, e.g., a fiber-reinforced thermoplastic composite article.

The multifunction end effector apparatus 702 further include a sensor system (not shown) and for locating a position of a piece, a location of a position at which a piece will be processed (e.g., cutting, welding, vacuuming etc.), and a location of the end effector to be used to perform the operation desired. The multifunction end effector apparatus 702 further includes a controller (not shown) for controlling a movement of the end effector 706 using the sensor system. The sensor system forms a feedback loop back to the controller providing sensor data that is used by controller to control movement of the robot 604 or end effector 706.

Figure 15:
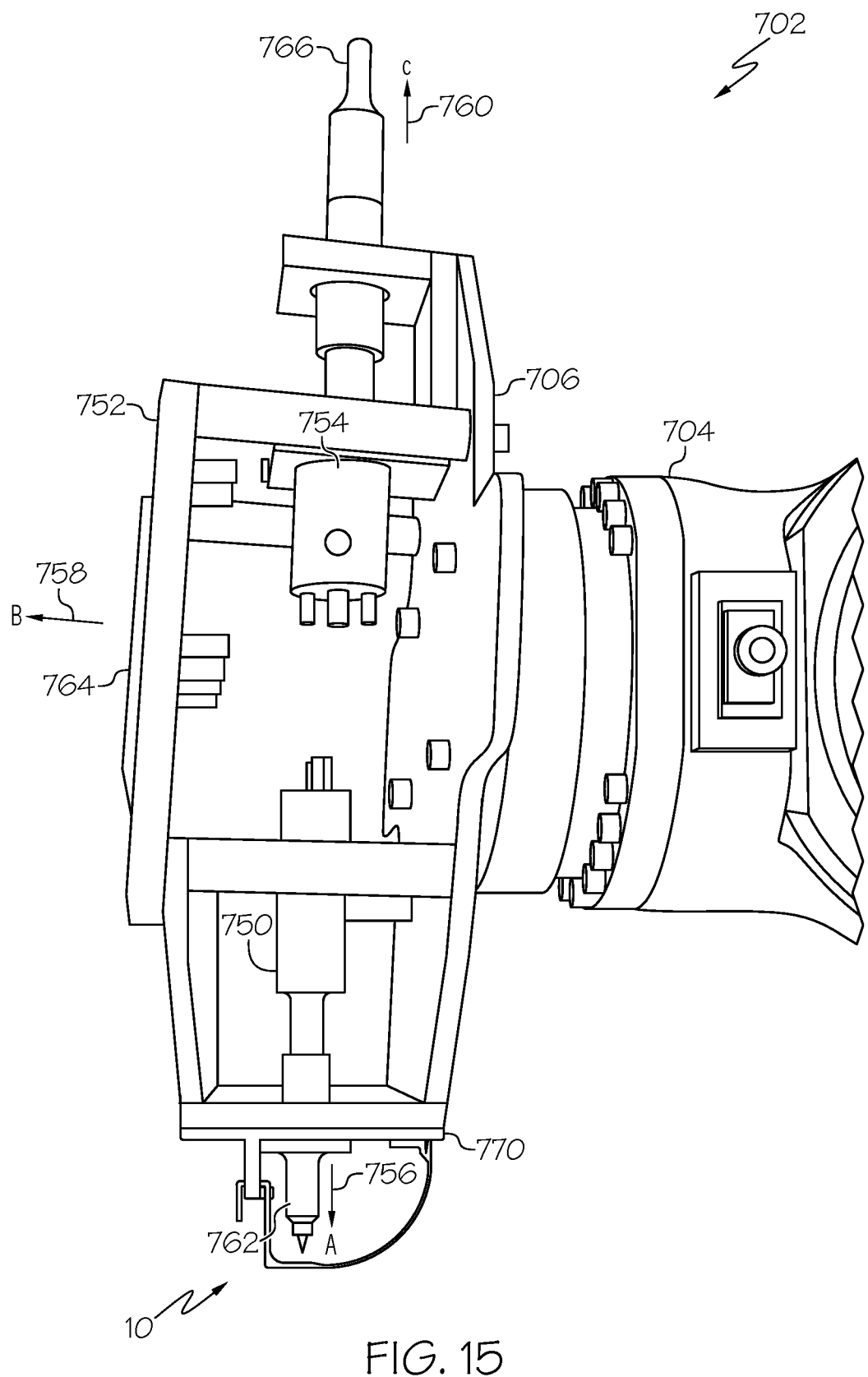
FIG. 15 is a perspective view of an exemplary manufacturing apparatus having a stabilizing shoe mounted thereon.
Figure 16:
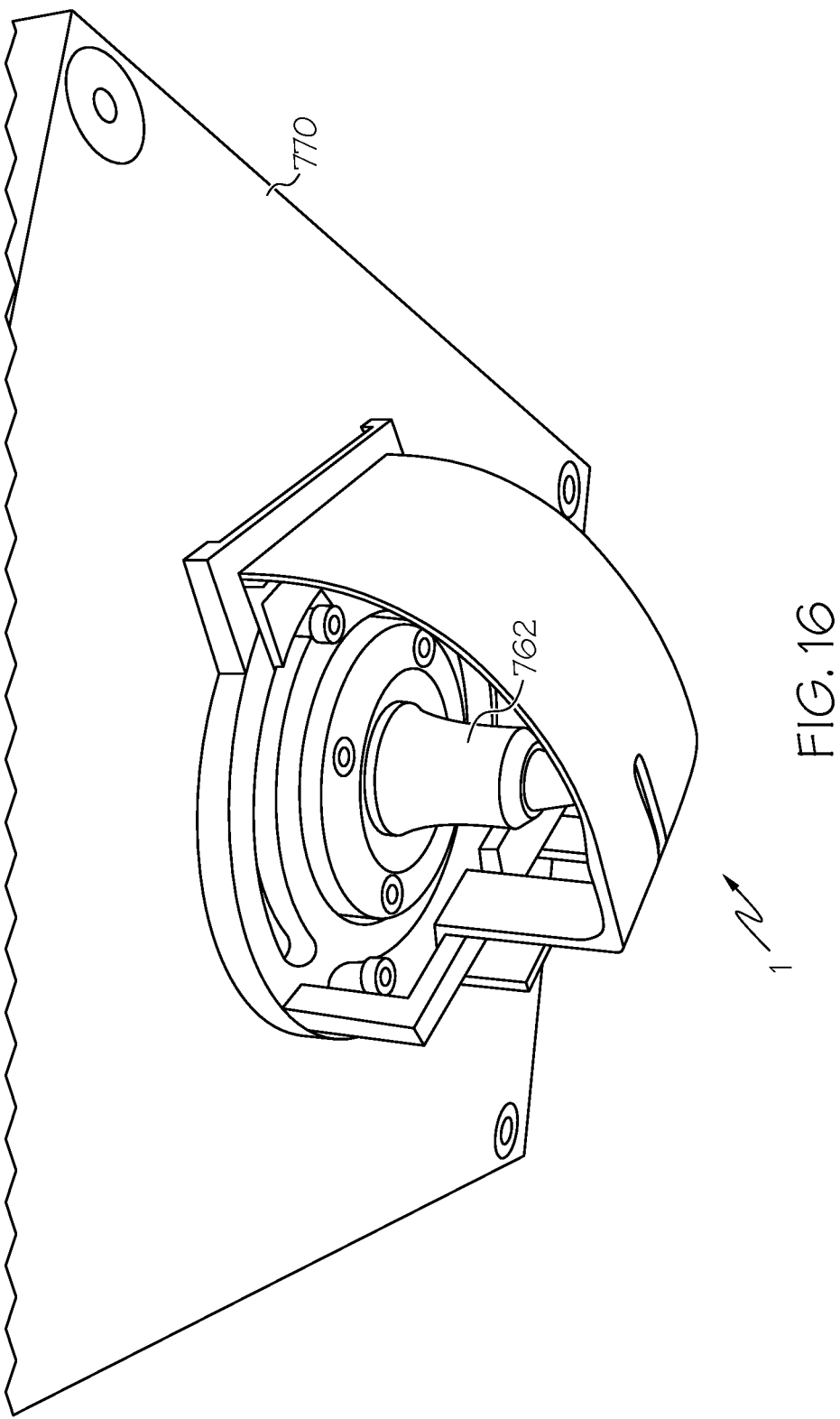
FIG. 16 is a perspective view of a stabilizing shoe mounted on a manufacturing apparatus.
Figure 17:
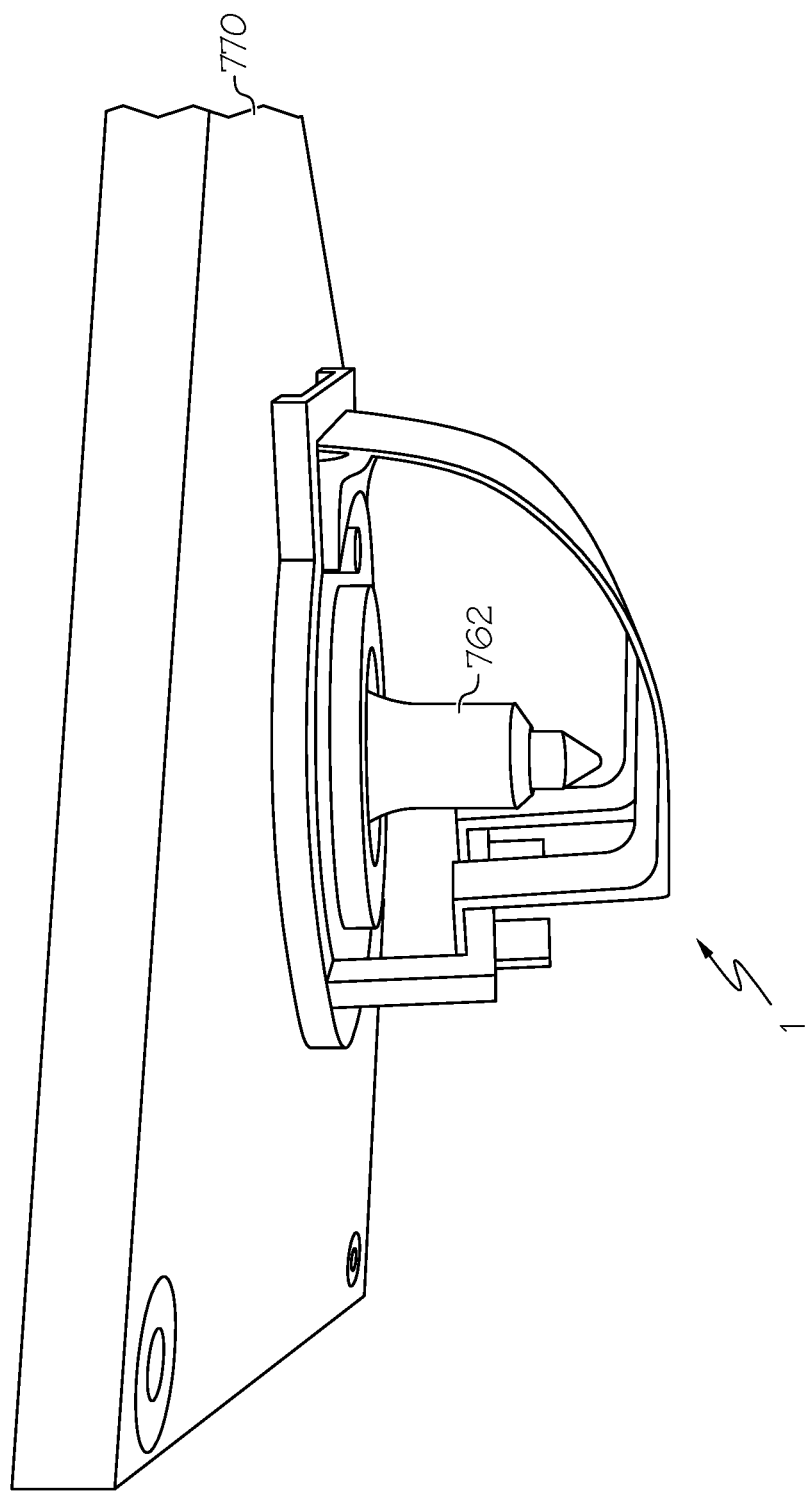
FIG. 17 is another perspective view of the stabilizing shoe mounted on the manufacturing apparatus.

FIGS. 15 to 17 illustrate the multifunction end effector apparatus of FIG. 14 having a stabilizing shoe mounted thereon. In the illustrated example, the stabilizing shoe includes a pressure foot coupled with a mounting base, and the mounting base is mounted to a processing device surface (e.g., housing 770) of the multifunction end effector apparatus 702. In another example (not shown), the pressure foot may be directly affixed to the processing device surface (e.g., housing 770) of the multifunction end effector apparatus 702 without an intermediate mounting base. As illustrated, the processing device includes a cutting head 750 of a multifunction end effector, in particular an ultrasonic knife of a multifunction end effector apparatus 702.

Figure 18:
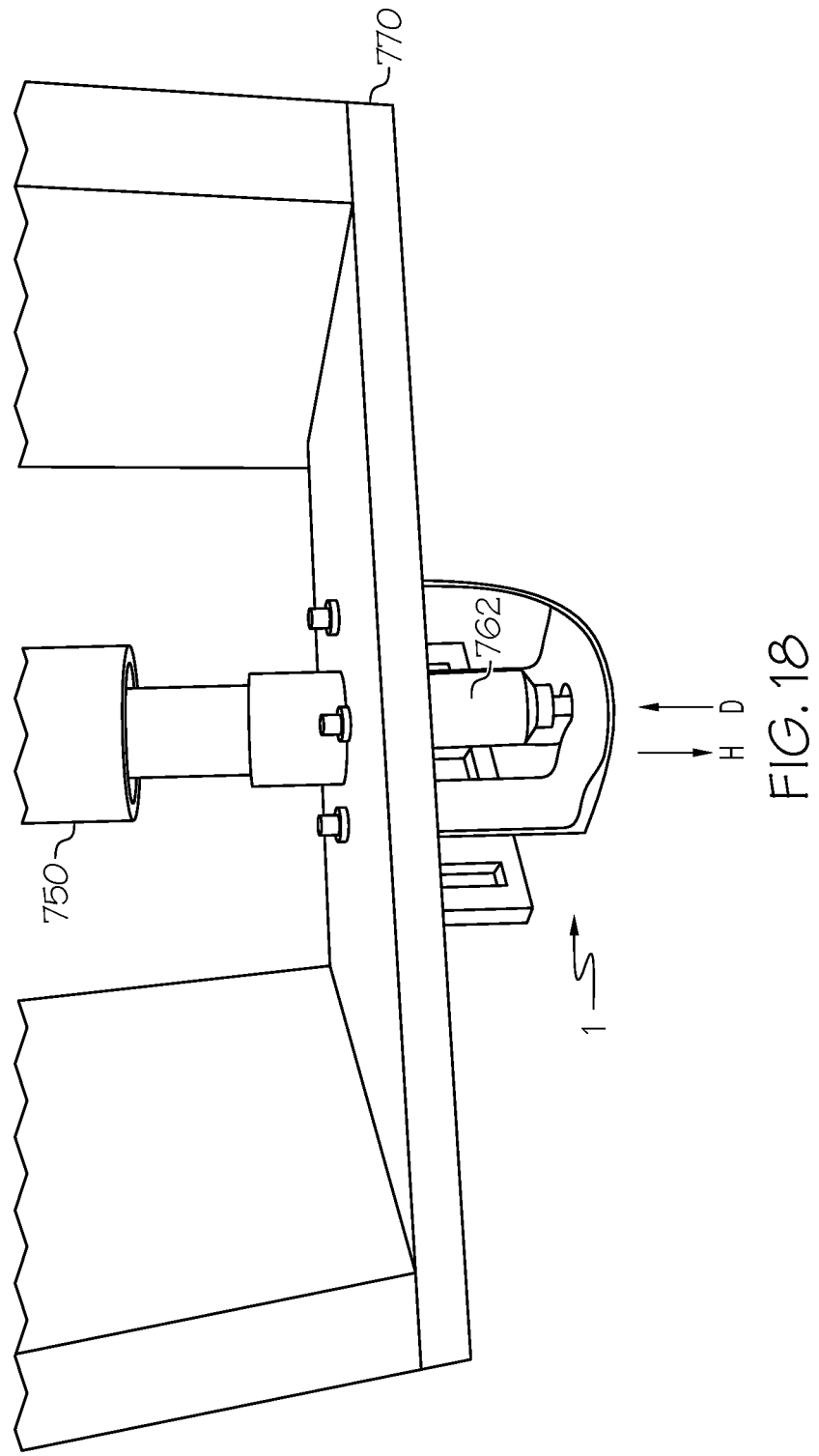
FIG. 18 is another perspective view of the stabilizing shoe mounted on the manufacturing apparatus, in which the pressure foot is in a displaced state.

FIG. 18 illustrates the stabilizing shoe 1 mounted on the multifunction end effector apparatus, after a displacement force D is applied on the engagement portion, such that the biasing portion displaces the pressure foot towards the mounting base and applies an opposing holding force H in response to the displacement of the pressure foot. As illustrated, when the displacement force D is applied on the engagement portion, such as by pressing down against a material to be cut, an ultrasonic cutter 762 of the cutting head 750 passes through an opening in an engagement portion of the pressure foot of the stabilizing shoe 1 as previously and hereafter described, and, thereby, the ultrasonic cutter 762 cuts the material. Meanwhile, the pressure foot of the stabilizing shoe 1 applies a holding force H against the material to be cut as previously and hereafter described.

Figure 19:
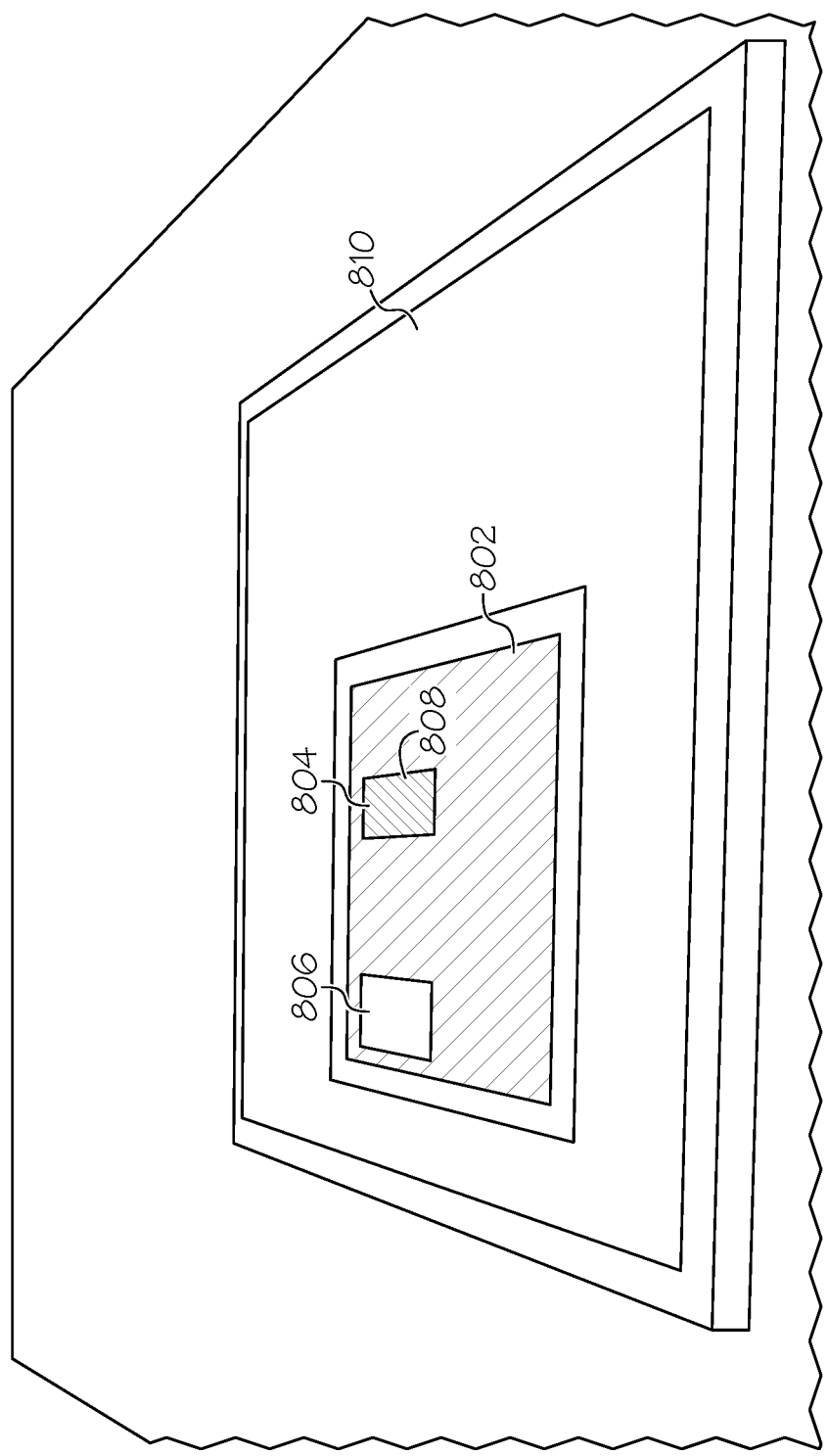
FIG. 19 illustrates an exemplary set-up in which the manufacturing apparatus and manufacturing method may be used to process a material.

FIG. 19 illustrates an exemplary set-up in which the manufacturing apparatus and manufacturing method may be used to process a material. The processing device is used to cut a fiber-reinforced thermoplastic material 802 via the ultrasonic cutter 762 of the cutting head 750 to form one or more thermoplastic parts, e.g., one or more fiber-reinforced thermoplastic parts. In the illustrated example, the fiber-reinforced thermoplastic material 802 is a single sheet and/or a lamina ply. In other examples, the fiber-reinforced thermoplastic material 802 includes multiple sheets and/or plies arranged in a stacked configuration. In the illustrated example, the ultrasonic cutter 762 of the cutting head 750 has already cut a first example thermoplastic part 804 from a first area 806 of the fiber-reinforced thermoplastic material 802. The first thermoplastic part 804 has been moved (e.g., via the vacuum head 752 of the multifunction end effector apparatus 702) from the first area 806 to a second example area 808 located on top of the fiber-reinforced thermoplastic material 802.

Figure 20:
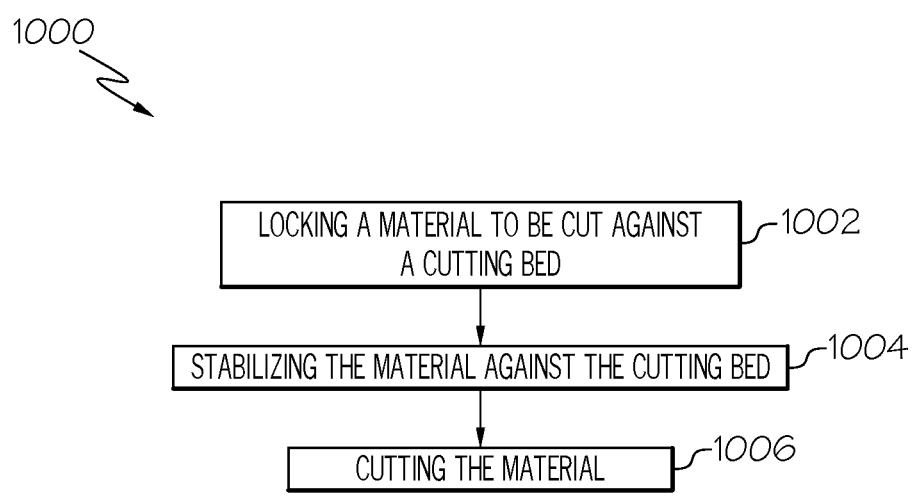
FIG. 20 is a flow chart illustrating an exemplary method of manufacturing.

FIG. 20 illustrates an exemplary method of manufacturing 1000 includes locking a material to be cut against a cutting bed 1002, stabilizing the material against the cutting bed 1004, and cutting the material 1006. In an aspect, the manufacturing method further includes locking the material against the cutting bed to stabilize the material to be cut against the cutting bed. In another aspect, cutting the material includes cutting the material with a knife. In another aspect, cutting the material with a knife includes cutting the material with a knife that applies lateral forces to the material while the knife cuts the material. In another aspect, locking the material includes locking the material to be cut against the cutting bed with an end effector device attached to the knife. In another aspect, the manufacturing method further includes turning the knife while the knife cuts the material. In another aspect, the manufacturing method includes changing a cutting direction of the knife in between cuts of the material. In another aspect, the material is thermoplastic, such as a fiber-reinforced thermoplastic lamina ply. In yet another aspect, the step of locking the material to be cut against the cutting bed includes downwardly displacing an ultrasonic cutting device having a pressure foot coupled thereto that deflects upon downward displacement contact against the thermoplastic lamina. In yet another aspect, a portion of an aircraft may be assembled using the method.

Figure 21:
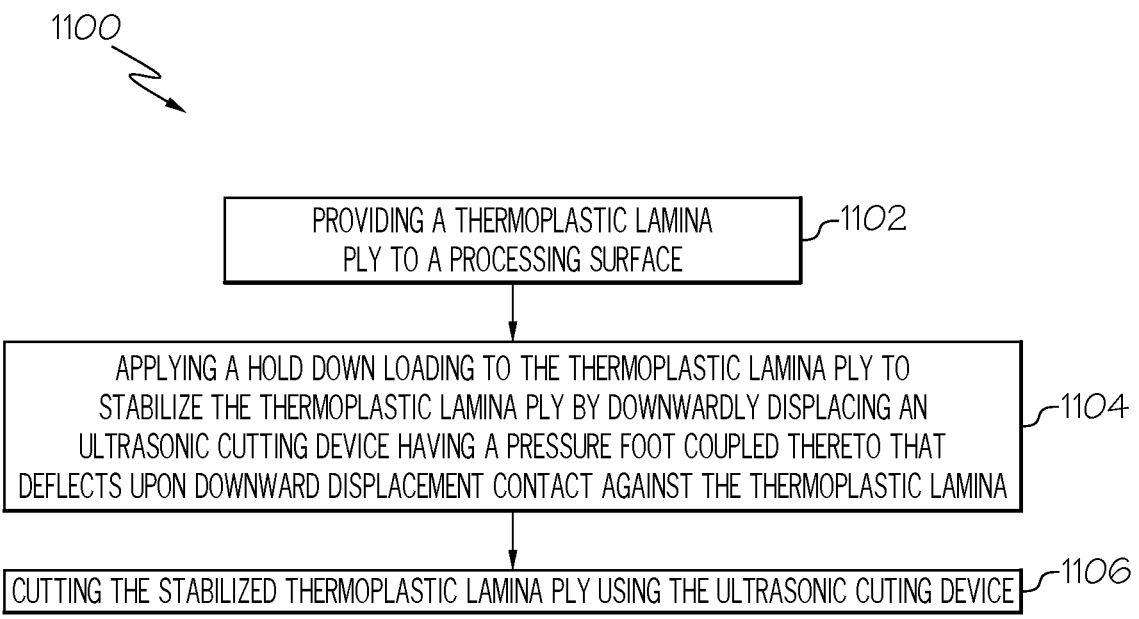
FIG. 21 is a flow chart illustrating another exemplary method of manufacturing.

FIG. 21 illustrates another exemplary method of manufacturing 1100 includes providing a thermoplastic lamina ply to a processing surface 1102, applying a hold down loading to the thermoplastic lamina ply to stabilize the thermoplastic lamina ply by downwardly displacing an ultrasonic cutting device having a pressure foot coupled thereto that deflects upon downward displacement contact against the thermoplastic lamina 1104, and cutting the stabilized thermoplastic lamina ply using the ultrasonic cutting device 1106. In an aspect, the thermoplastic lamina ply being cut is a fiber-reinforced thermoplastic lamina ply. In another aspect, the manufacturing method may further include turning a blade of the ultrasonic cutting device as the blade cuts the thermoplastic lamina ply. In yet another aspect, the manufacturing method may further include changing a cutting direction of a blade of the ultrasonic cutting device in between cuts of the thermoplastic lamina ply. In yet another aspect, the manufacturing method tilting a blade of the ultrasonic cutting device in a backward direction as the blade cuts the thermoplastic lamina ply. In yet another aspect, the manufacturing method includes tilting a blade of the ultrasonic cutting device in a sideways direction as the blade cuts the thermoplastic lamina ply. In yet another aspect, a portion of an aircraft may be assembled using the method. The manufacturing method may use any of the features of the stabilizing shoe or processing apparatus as previously described.

The methods of manufacturing of the present description provide a significant improvement for a manufacturing apparatus and manufacturing method, particularly for a robotically positioned, composite material ultrasonic knife cutting process. Some composite materials, such as fiber-reinforced thermoplastic material, are stiff and slick and they slide easily as a knife cuts through the material at certain angles, even when the material is being held on a vacuum hold down table.

The previous solutions were to use a vacuum table to pull the fiber-reinforced thermoplastic material down against the cutting surface (bed). However, the fiber-reinforced thermoplastic material can be so porous that a vacuum from the vacuum table cannot be raised high enough to adequately hold the material against the table well enough to allow a clean cut using an ultrasonic knife (or other cutting methods). For example, when cutting a "cloth" style material, woven into a crisscross pattern (as opposed to unidirectional material), the cloth material does not pull down very well on the vacuum table because it is porous, and, in addition, the cloth material is slippery.

When the material being cut slips, and/or the knife tears the material, the previous solution for cutting a porous material was to cover the material with a blanket and cut through both the blanket and the material. This blanket seals the vacuum leaks through the material and increases the hold down pressure to a degree, but nearest the cutting blade there is still a limited force holding the material steady. Additionally, and very significantly, when a Mylar (or other material) blanket or cover sheet is used, it adds a step to the process which limits the automation aspects of the process, that is, automating the process would require an additional step to remove the blanket before the cut ply can be placed into a layup.

The present description improves the cutting process significantly, by holding the cut material against the cutting bed in such fashion as to stabilize it and keep it from sliding, tearing and splitting as the knife moves through it. This allows smooth cutting and especially smooth turning of the knife as it proceeds through a composite material at angles relative to the surface of the material, thereby avoiding inner fiber shear damage when cut against a surface during ultrasonic cutting processes.

Previous to the present description, there was trouble with was slowly moving out of the zero-direction of the fibers as a knife cuts. That is, if the knife was turned slowly away from a zero-degree direction (i.e. alignment direction of fibers) as the knife was cutting, then fibers were pulled along with the edge of the knife blade as it cut and turned, and the knife skidded along the fibers and did not cleanly cut through the fibers. Thus, the present description is particularly advantageous for the cutting of non-homogenous materials, such materials having unidirectional fibers, which only strength in one direction, and in particular for the cutting of such materials when cut at a slight angle off of zero-degree direction.

There was also a previously a problem with an instantaneous turn (i.e. changing directions), such as turning a knife 45 degrees while within the material. In this case, while the knife blade was in the material, and if it turned without moving, then the knife pulled material out of the cut at the turn point, because the knife has a certain blade width. The present description also improves an ability to change a cutting direction of a knife while avoiding pulling a material out of the cut.

The present description also may improve the cutting process by permitting for a change in a shape of a blade to a more optimal configuration in order to make angled cuts. For example, the blade may be positioned at an angle to provide for a beveled cut or tilted back to hold down material better.

Additionally, the present description provides for improved coverage of knife, while in use or while not in use, to protect it from inadvertent contact from external objects or to protect external objects from inadvertent content with the knife.

An exemplary stabilizing shoe has been fabricated of polyetherimide (PEI) material using fused deposition modeling (FDM) additive manufacturing (3D printing). The stabilizing shoe improved the material cutting process by pressing a cut material against a cutting bed in such fashion as to stabilize it and keeping it from splitting, allowing smooth cutting by and especially smooth turning of a knife as it proceeded through the composite material. The exemplary stabilizing shoe was used for cutting a fiber-reinforced thermoplastic material, which is especially difficult to hold against a cutting bed while a knife is applying lateral forces to make turns as it cuts, because the fiber-reinforced thermoplastic material is "boardy" and slick. The stabilizing shoe advantageously holds down the fiber-reinforced thermoplastic material by pressing against the material on both sides of the knife during the cutting process.

The stabilizing shoe of the present description has been mounted to the bottom of a cutting head of a robotically controlled multifunction end effector where the blade of the ultrasonic knife protrudes. The stabilizing shoe surrounds the blade location and gives a very consistent pressure to the material being cut. By way of the stabilizing shoe, the material is pushed down against the cutting bed in such fashion as to lock the material against the bed, as the material is cut, eliminating the need for the cutting blanket described above. This minimizes the difficulty in the automation of the cutting, pick and place, and layup processes.

The knife itself was fabricated of ULTEM material using a 3D printed, FDM process. The stabilizing shoe also incorporated a removable snap-in foot allowing for quick modifications. The stabilizing shoe also had slotted holes in the base allowing it to rotate with any change in the knife angle due to manufacturing variation in the blades as they wear and may be changed out. The pressure foot is elastically loaded by bending the foot back and locking it to the frame. This allows for the knife to be moved against the material without inference from the foot. The foot can thereby give with the variation in the vertical positioning of the robotic cutting head it is mounted to. The stabilizing shoe will eliminate a complete step in the automation of the thermoplastic layup process, thereby making a layup process automation more cost-effective.

Figure 22:
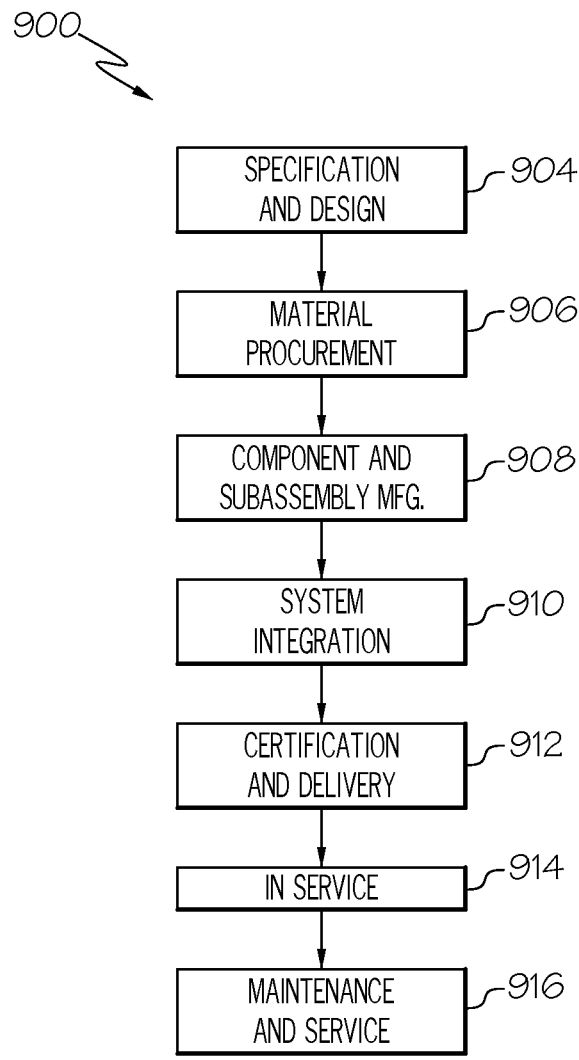
FIG. 22 is flow diagram of an aircraft manufacturing and service methodology.
Figure 23:
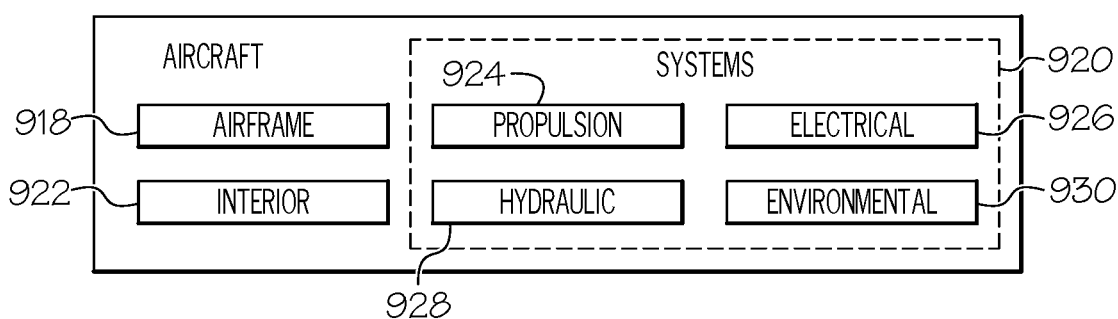
FIG. 23 is a block diagram of an aircraft.

Examples of the present disclosure may be described in the context of an aircraft manufacturing and service method 900, as shown in FIG. 21, and an aircraft 902, as shown in FIG. 22. During pre-production, the aircraft manufacturing and service method 900 may include specification and design 904 of the aircraft 902 and material procurement 906. During production, component/subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916, which may also include modification, reconfiguration, refurbishment and the like.

Each of the processes of aircraft manufacturing and service method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed stabilizing shoe, manufacturing apparatus and manufacturing method may be employed during any one or more of the stages of the aircraft manufacturing and service method 900, including specification and design 904 of the aircraft 902, material procurement 906, component/subassembly manufacturing 908, system integration 910, certification and delivery 912, placing the aircraft in service 914, and routine maintenance and service 916

As shown in FIG. 22, the aircraft 902 produced by aircraft manufacturing and service method 900 may include an airframe 918 with a plurality of systems 920 and an interior 922. Examples of the plurality of systems 920 may include one or more of a propulsion system 924, an electrical system 926, a hydraulic system 928, and an environmental system 930. Any number of other systems may be included. The disclosed stabilizing shoe, manufacturing apparatus, and manufacturing method may be employed for any of the systems of the aircraft 902, including the airframe 918 and the interior 922.

As one example, the disclosed stabilizing shoe, manufacturing apparatus and manufacturing method may be employed during material procurement 906. As another example, components or subassemblies corresponding to component/subassembly manufacturing 908, system integration 910, and or maintenance and service 916 may be fabricated or manufactured using the disclosed stabilizing shoe, manufacturing apparatus and manufacturing method. As another example, the airframe 918 and the interior 922 may be constructed using the disclosed stabilizing shoe, manufacturing apparatus and manufacturing method. Also, one or more apparatus examples, method examples, or a combination thereof may be utilized during component/subassembly manufacturing 908 and/or system integration 910, for example, by substantially expediting assembly of or reducing the cost of an aircraft 902, such as the airframe 918 and/or the interior 922. Similarly, one or more of system examples, method examples, or a combination thereof may be utilized while the aircraft 902 is in service, for example and without limitation, to maintenance and service 916.

The disclosed stabilizing shoe, manufacturing apparatus and manufacturing method are described in the context of an aircraft; however, one of ordinary skill in the art will readily recognize that the disclosed stabilizing shoe, manufacturing apparatus and manufacturing method may be utilized for a variety of vehicles and non-vehicles. For example, implementations of the embodiments described herein may be implemented in any type of vehicle including, e.g., helicopters, passenger ships, automobiles and the like.

Although various embodiments of the disclosed stabilizing shoe, manufacturing apparatus, and manufacturing method have been shown and described, modifications may occur to those skilled in the art upon reading the specification. The present application includes such modifications and is limited only by the scope of the claims.

What is claimed is:

1. A manufacturing method comprising:
   locking a material to be cut against a processing surface of a cutting bed;
   stabilizing the material against the processing surface of the cutting bed including applying a hold down loading to the material to stabilize the material by downwardly displacing an ultrasonic cutting device having a pressure foot coupled thereto that deflects upon downward displacement contact against the material, including pressing against the material with an engagement portion of the pressure foot, the engagement portion comprising a first flat engagement portion extending in a linear direction parallel to a cutting direction and a second flat engagement portion extending in the linear direction parallel to the cutting direction, wherein the first flat engagement portion and the second flat engagement portion define an elongated slot therebetween, the elongated slot being elongated in the linear direction parallel to the cutting direction; and
   cutting the material in the cutting direction, wherein the cutting direction is within a plane parallel to a plane defined by the processing surface,
   wherein the hold down loading is applied to the material to be cut by a stabilizing shoe, the stabilizing shoe comprising:
   the pressure foot having the engagement portion pressing against the material to be cut;
   a mounting base; and
   a biasing portion linking the pressure foot and the mounting base,
   wherein the mounting base defines an opening therein through which a processing tool accesses the thermoplastic lamina ply.

2. The method of claim 1 further comprising locking the material against the cutting bed to stabilize the material to be cut against the cutting bed.

3. The method of claim 1 wherein cutting the material includes cutting the material with a knife.

4. The method of claim 3 wherein cutting the material with a knife includes cutting the material with a knife that applies lateral forces to the material while the knife cuts the material.

5. The method of claim 3 wherein locking the material includes locking the material to be cut against the cutting bed with an end effector device attached to the knife.

6. The method of claim 1 further comprising turning the knife while the knife cuts the material.

7. The method of claim 1 further comprising changing a cutting direction of the knife in between cuts of the material.

8. The method of claim 1 wherein the material is thermoplastic.

9. The method of claim 1 wherein the material is a fiber-reinforced thermoplastic lamina ply.

10. The method of claim 1 wherein the step of locking the material to be cut against the cutting bed includes downwardly displacing an ultrasonic cutting device having a pressure foot coupled thereto that deflects upon downward displacement contact against the material to be cut.

11. A portion of an aircraft assembled according to the method of claim 1.

12. A manufacturing method, comprising:
   providing a thermoplastic lamina ply to a processing surface;
   applying a hold down loading to the thermoplastic lamina ply to stabilize the thermoplastic lamina ply by downwardly displacing an ultrasonic cutting device having a pressure foot coupled thereto that deflects upon downward displacement contact against the thermoplastic lamina, including pressing against the material with an engagement portion of the pressure foot, the engagement portion comprising a first flat engagement portion extending in a linear direction parallel to a cutting direction and a second flat engagement portion extending in the linear direction parallel to the cutting direction, wherein the first flat engagement portion and the second flat engagement portion define an elongated slot therebetween, the elongated slot being elongated in the linear direction parallel to the cutting direction; and cutting the stabilized thermoplastic lamina ply in the cutting direction using the ultrasonic cutting device, wherein the cutting direction is within a plane parallel to a plane defined by the processing surface, wherein the hold down loading is applied to the thermoplastic lamina ply by a stabilizing shoe, the stabilizing shoe comprising:

the pressure foot having the engagement portion pressing against the thermoplastic lamina ply;

a mounting base; and a biasing portion linking the pressure foot and the mounting base, wherein the mounting base defines an opening therein through which a processing tool accesses the thermoplastic lamina ply.

13. The method of claim 12 wherein the thermoplastic lamina ply being cut is a fiber-reinforced thermoplastic lamina ply.

14. The method of claim 12 further comprising turning a blade of the ultrasonic cutting device as the blade cuts the thermoplastic lamina ply.

15. The method of claim 12 further comprising changing a cutting direction of a blade of the ultrasonic cutting device in between cuts of the thermoplastic lamina ply.

16. The method of claim 12 further comprising tilting a blade of the ultrasonic cutting device in a backward direction as the blade cuts the thermoplastic lamina ply.

17. The method of claim 12 further comprising tilting a blade of the ultrasonic cutting device in a sideways direction as the blade cuts the thermoplastic lamina ply.

18. A portion of an aircraft assembled according to the method of claim 12.

19. The method of claim 12 further comprising guiding the thermoplastic lamina ply downwardly towards the processing surface in advance of pressing against the thermoplastic lamina with at least one flat engagement portion of the pressure foot.

20. The method of claim 12 further comprising turning the at least one flat engagement portion while turning a blade of the ultrasonic cutting device as the blade cuts the thermoplastic lamina ply.

21. The method of claim 12 wherein the engagement portion is defined by:

a forward direction leading to a forwardmost portion of the engagement portion;

a rear direction leading to a rearwardmost portion of the engagement portion;

a left direction leading to a leftwardmost portion of the engagement portion; and a right direction leading to a rightwardmost portion of the engagement portion, wherein the first flat engagement portion has a width defined by the leftwardmost portion of the engagement portion and the left slot edge of the elongated slot, wherein the second flat engagement portion has a width defined by the rightwardmost portion of the engagement portion and the right slot edge of the elongated slot, wherein the elongated slot has a length defined by a front slot edge disposed in the forward direction and a rear slot edge disposed in the rear direction, and wherein the elongated slot has a width defined by a left slot edge disposed in the left direction and a right slot edge disposed in the right direction.

22. The method of claim 21 wherein the width of the elongated slot is less than the width of the first flat engagement portion and less than the width of the second flat engagement portion.

23. The method of claim 21 wherein the engagement portion defines:

a front section that extends continuously from the leftwardmost portion of the engagement portion to the rightwardmost portion of the engagement portion; and a rear section comprising the first flat engagement portion and the second flat engagement portion.

24. The method of claim 12 wherein the biasing portion displaces the pressure foot towards the mounting base upon application of a displacement force against the engagement portion and applies an opposing holding force in response to the displacement of the pressure foot.

25. The method of claim 24 wherein the biasing portion includes an elastically deformable guide portion guiding the thermoplastic lamina ply to the engagement portion.

26. The method of claim 25 wherein the guide portion of the pressure foot is coupled to the engagement portion of the pressure foot, wherein the guide portion elastically deforms upon application of the displacement force against the engagement portion, and wherein the guide portion applies the opposing holding force in response to the elastic deformation.

27. The method of claim 25 wherein the guide portion is formed in the shape of a curved leaf spring.

28. The method of claim 12 wherein the pressure foot is manufactured from a thermoplastic material.

29. The method of claim 12 wherein the pressure foot is coupled to the mounting base by way of a snap-in connection.

30. The method of claim 12 wherein the mounting base defines one or more slotted holes for adjustably mounting the mounting base to a processing device.

31. The method of claim 12 wherein the pressure foot and the mounting base each comprise locking portions for locking against a displacement of the pressure foot away from the mounting base.

32. The method of claim 31 wherein the pressure foot and the mounting base comprise tab and groove connectors for limiting a shifting between the pressure foot and the mounting base.

* * * * *